United States Patent
Mahfouz

(10) Patent No.: US 12,522,882 B2
(45) Date of Patent: *Jan. 13, 2026

(54) LEATHER SURFACE MODIFICATION COMPOSITIONS AND METHODS OF USE THEREOF

(71) Applicant: Energizer Auto, Inc., St. Louis, MO (US)

(72) Inventor: Grace Nabil Mahfouz, Rocky River, OH (US)

(73) Assignee: Energizer Auto, Inc., St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/754,845

(22) Filed: Jun. 26, 2024

(65) Prior Publication Data

US 2024/0344154 A1 Oct. 17, 2024

Related U.S. Application Data

(63) Continuation of application No. 17/716,680, filed on Apr. 8, 2022, now Pat. No. 12,031,188.

(60) Provisional application No. 63/172,220, filed on Apr. 8, 2021.

(51) Int. Cl.
*C14C 9/00* (2006.01)

(52) U.S. Cl.
CPC .................................... *C14C 9/00* (2013.01)

(58) Field of Classification Search
CPC .......... C14C 9/00; C08G 77/26; C09D 183/08
USPC ............................................. 8/94.1 R, 94.15
See application file for complete search history.

(56) References Cited

U.S. PATENT DOCUMENTS

| 5,154,759 | A | 10/1992 | Cifuentes et al. |
| 9,506,019 | B2 | 11/2016 | Vetter et al. |
| 2007/0128962 | A1* | 6/2007 | Serobian ............... C09D 183/04 525/477 |
| 2007/0163463 | A1* | 7/2007 | Hasinovic ................ C09G 1/08 106/3 |
| 2010/0024935 | A1 | 2/2010 | Jubran |
| 2011/0243878 | A1 | 10/2011 | Panandiker et al. |
| 2012/0252716 | A1 | 10/2012 | Barnabas et al. |
| 2013/0260068 | A1 | 10/2013 | Serobian et al. |
| 2014/0030205 | A1 | 1/2014 | Panandiker et al. |
| 2015/0093350 | A1 | 4/2015 | Panandiker et al. |
| 2016/0060581 | A1 | 3/2016 | Panandiker et al. |
| 2016/0102179 | A1 | 4/2016 | Wagner et al. |

(Continued)

FOREIGN PATENT DOCUMENTS

| CN | 1930341 A | 3/2007 |
| EP | 2211995 B1 | 1/2012 |

(Continued)

OTHER PUBLICATIONS

APS-ME357 Technical Data Sheet, Advanced Polymer, Inc., revised Apr. 11, 2017 (2 pages).

(Continued)

*Primary Examiner* — Eisa B Elhilo
(74) *Attorney, Agent, or Firm* — Lee & Hayes, P.C.

(57) ABSTRACT

Compositions and methods for use provide enhanced surface modification in leather care. In particular, the present disclosure is directed to water-based compositions including a silicone emulsion that delivers cleaning, protective, and preservative qualities.

19 Claims, 50 Drawing Sheets

(56) References Cited

U.S. PATENT DOCUMENTS

2019/0322877 A1\* 10/2019 Deddo ................ C09D 157/08
2022/0333218 A1 10/2022 Mahfouz

FOREIGN PATENT DOCUMENTS

| WO | WO2008114226 A1 | 9/2008 |
| WO | WO2010138270 A1 | 12/2010 |
| WO | WO2012135411 A1 | 10/2012 |
| WO | WO2010139466 A1 | 12/2020 |

OTHER PUBLICATIONS

APS-385B Technical Data Sheet, Advanced Polymer, Inc., revised Jul. 9, 2015 (1 page).
Office Action for U.S. Appl. No. 17/716,680, mailed on Sep. 8, 2023, Grace Nabil Mahfouz, "Leather Surface Modification Compositions and Methods of Use Thereof", 7 pages.
Office Action for U.S. Appl. No. 17/716,680, mailed on Dec. 19, 2023, Grace Nabil Mahfouz, "Leather Surface Modification Compositions and Methods of Use Thereof", 7 pages.

\* cited by examiner

- SiO2 based, long-lasting stain repelling technology
- Protects from tough liquids and stains, and helps to repel dirt and grime
- Provides easier cleaning
- UV blockers protect and maintain leather
- Safe for heated seats and perforated leather surfaces
- Provides a non greasy look and feel
- Dye free formula is safe for leather of any color

*FIG. 26*

LEATHER SURFACE MODIFICATION COMPOSITIONS AND METHODS OF USE THEREOF

CROSS REFERENCED TO RELATED APPLICATIONS

This application is a continuation of co-pending U.S. application Ser. No. 17/716,680, filed Apr. 8, 2022, which claims the benefit of priority of U.S. Application No. 63/172,220, entitled "Leather Surface Modification Compositions and Methods of Use Thereof," filed Apr. 8, 2021, all of which are expressly incorporated herein by reference in entirety.

FIELD OF THE DISCLOSURE

Described herein are compositions and methods for use in leather care. In particular, the present disclosure is directed to water-based compositions comprising a silicone emulsion that deliver cleaning, protective, and preservative qualities.

BACKGROUND OF THE DISCLOSURE

Leather treatment products currently on the market, such as those for automotive leather surfaces, offer to provide hydrophobic effects, however, there are various drawbacks and issues with these products. Moreover, one must use multiple products to deliver hydrophobicity and cleaning properties.

There remains a need, therefore, to provide a leather surface modification composition—in one product—that is capable to deliver cleaning, protection, and preservation to leather surfaces, meanwhile providing an improved hydrophobic effect.

These new products contain a leather cleaner formula that delivers the benefit of repellency through ceramic-based hydrophobic technology.

SUMMARY OF THE DISCLOSURE

In one aspect, the present disclosure is directed to a composition comprising: a cationic amino functional silicone emulsion, a protectant, and a preservative.

In another aspect, the present disclosure is directed to method of treating a leather surface, the method comprising: applying a composition to the leather surface, wherein the composition comprises: a cationic amino functional silicone emulsion, a protectant, and a preservative.

BRIEF DESCRIPTION OF THE DRAWINGS

FIG. 26 depicts a summary of the benefits of compositions in accordance with the present disclosure.

DETAILED DESCRIPTION OF THE DISCLOSURE

Figure 1A:
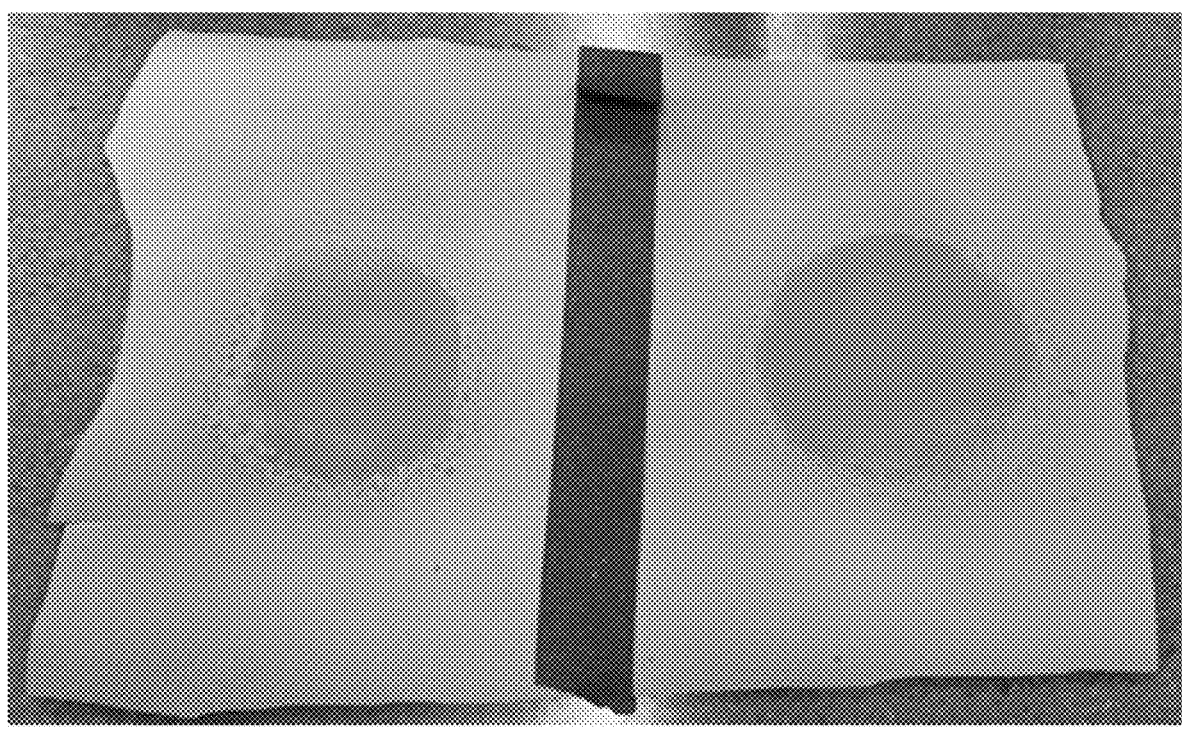
FIG. 1A depicts a white leather surface covered with black charm clay/dirt/grime before application of a composition in accordance with the present disclosure.
Figure 1B:
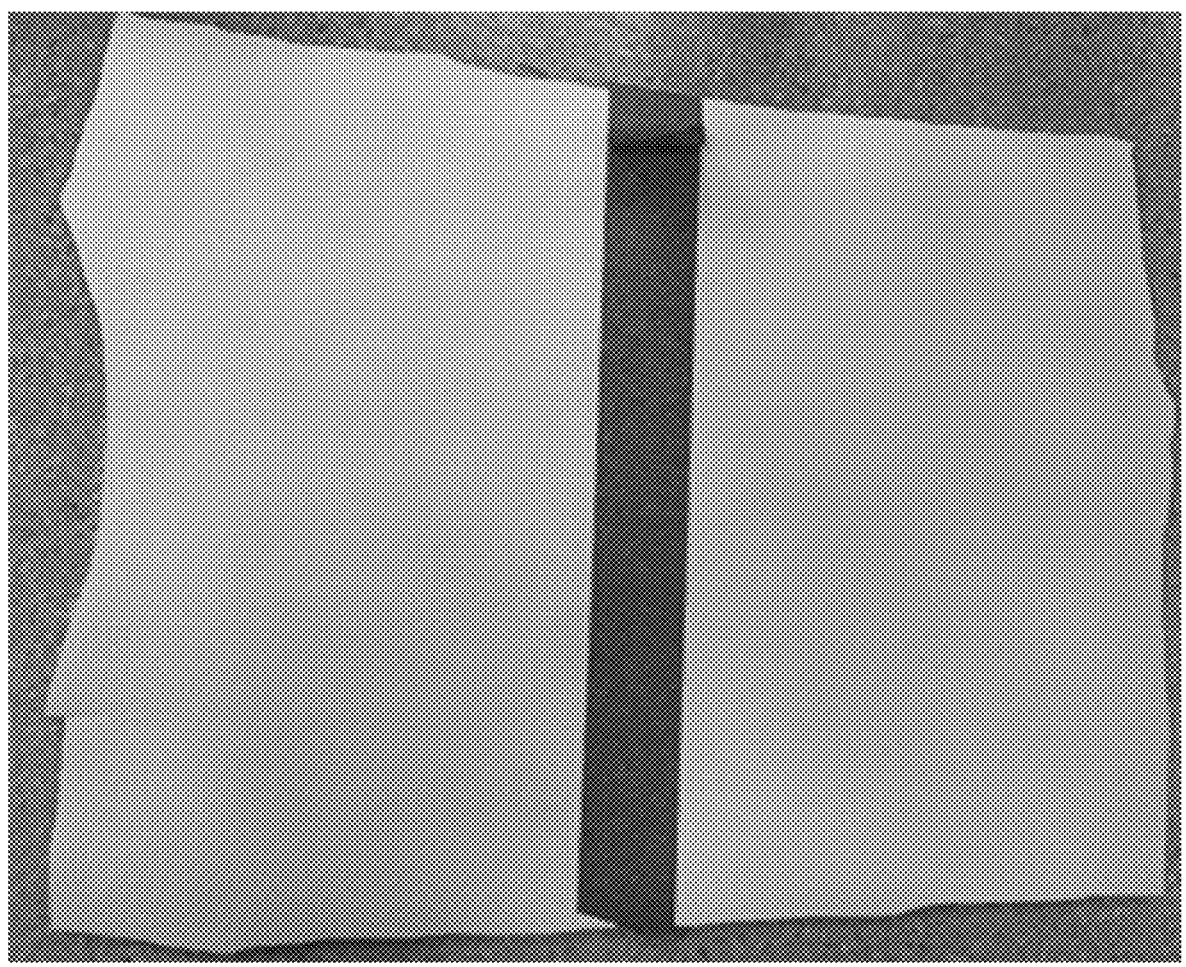
FIG. 1B depicts a white leather surface not covered with black charm clay/dirt/grime after application of water (left side of the tape) or a composition in accordance with the present disclosure (right side of the tape).
Figure 2A:
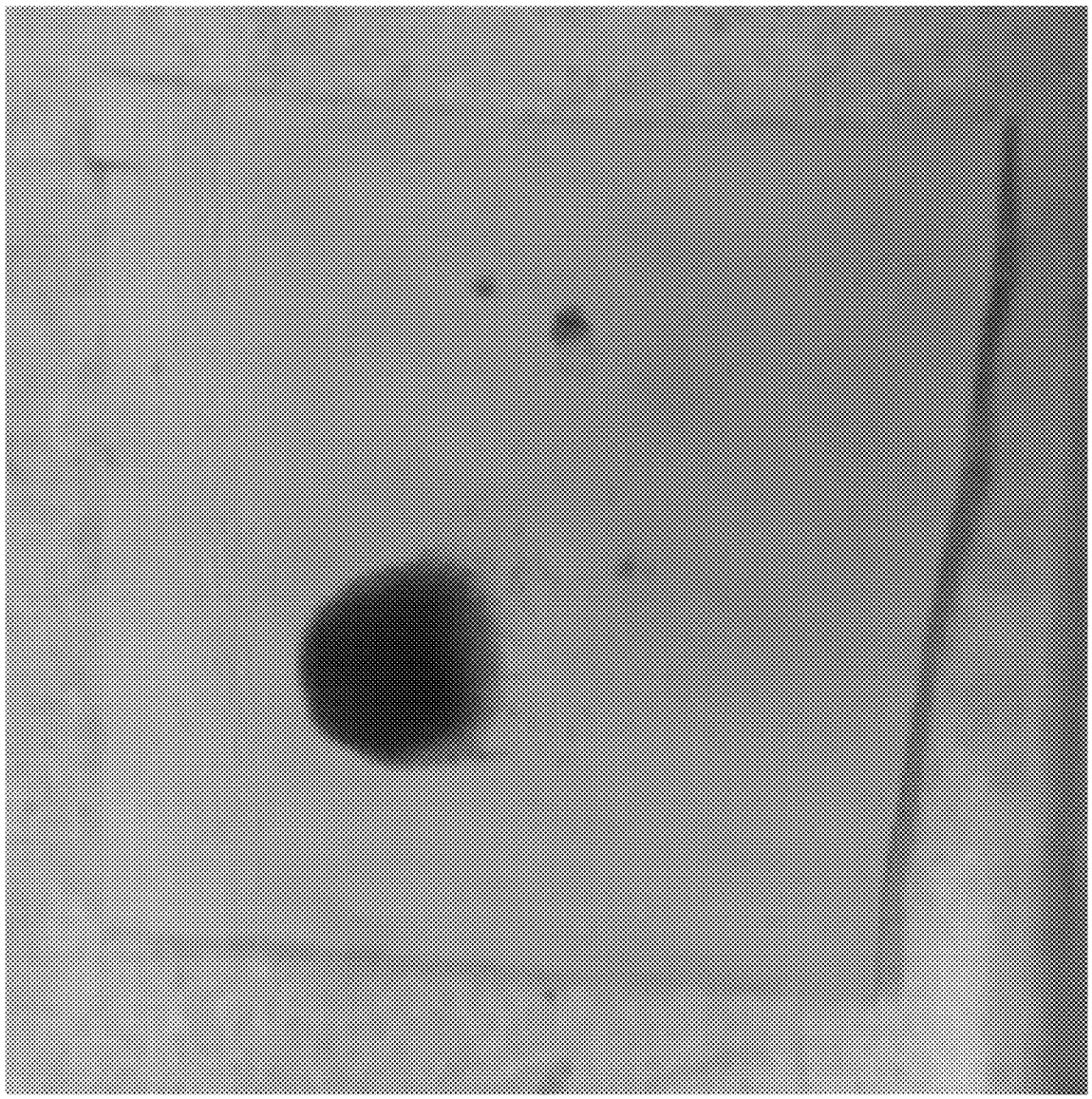
FIG. 2A depicts a white leather surface covered with a cola before application of a composition in accordance with the present disclosure.
Figure 2B:
FIG. 2B depicts a white leather surface not covered with a cola after application of a composition in accordance with the present disclosure.
Figure 2C:
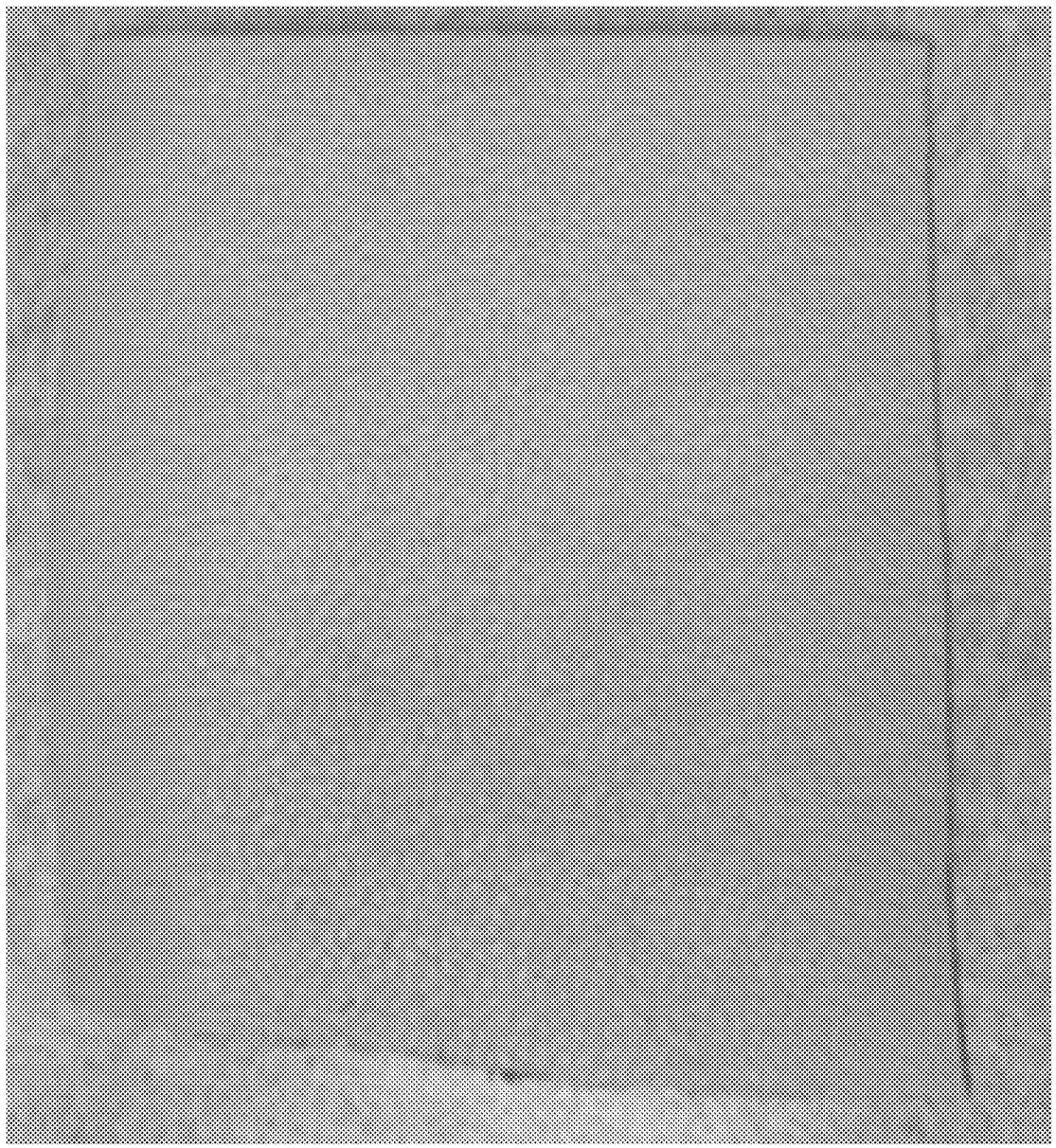
FIG. 2C depicts a white leather surface not covered with a cola after application of water.
Figure 3A:
FIG. 3A depicts a white leather surface slightly covered with foundation/makeup after application of a composition in accordance with the present disclosure.
Figure 3B:
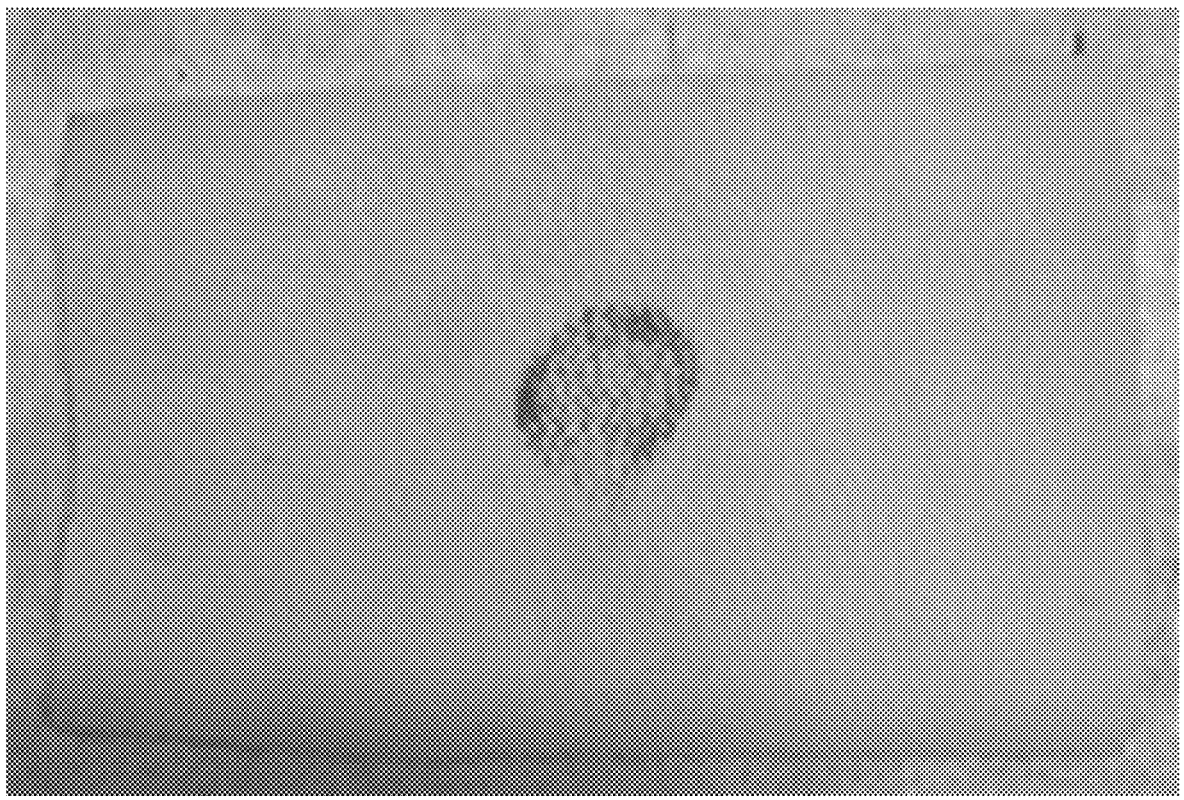
FIG. 3B depicts a white leather surface covered with foundation/makeup after application of water.
Figure 4A:
FIG. 4A depicts a white leather surface covered with an energy drink before application of a composition in accordance with the present disclosure.
Figure 4B:
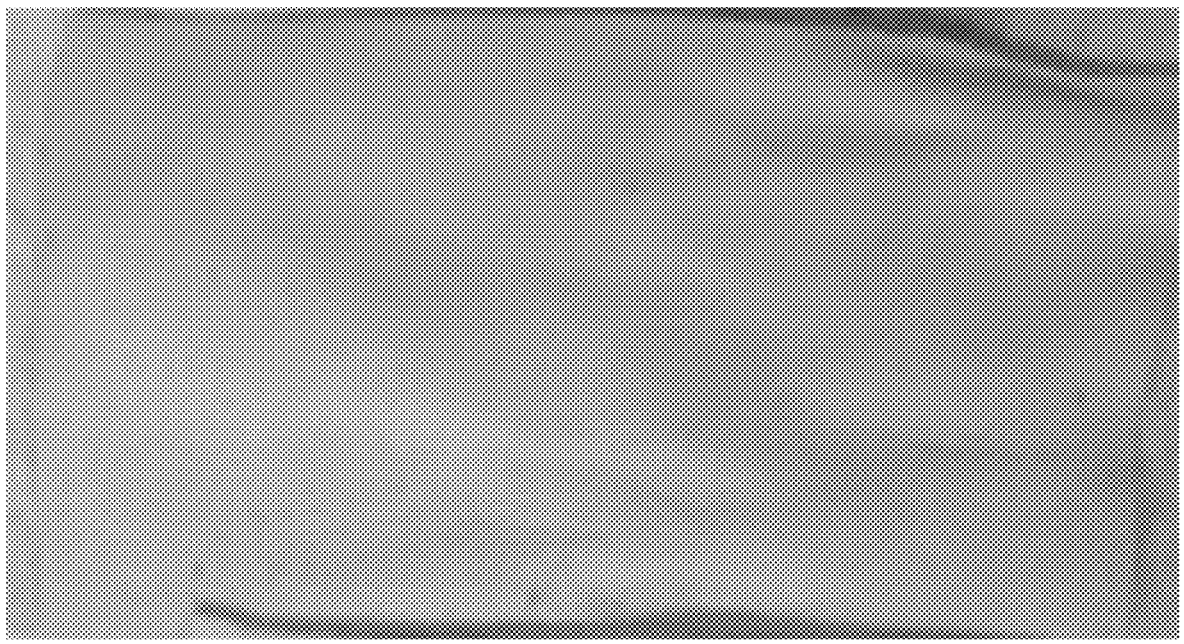
FIG. 4B depicts a white leather surface not covered with an energy drink after application of a composition in accordance with the present disclosure.
Figure 4C:
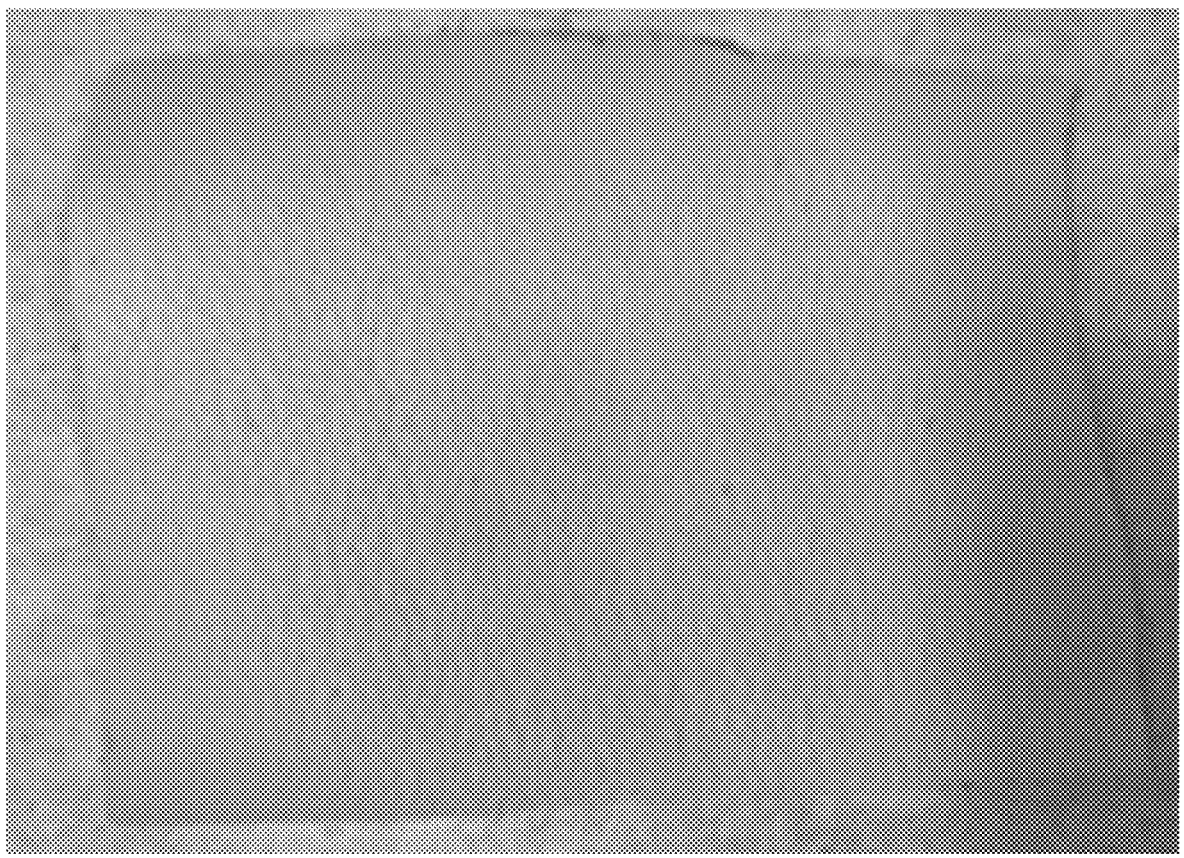
FIG. 4C depicts a white leather surface not covered with an energy drink after application of water.
Figure 5A:
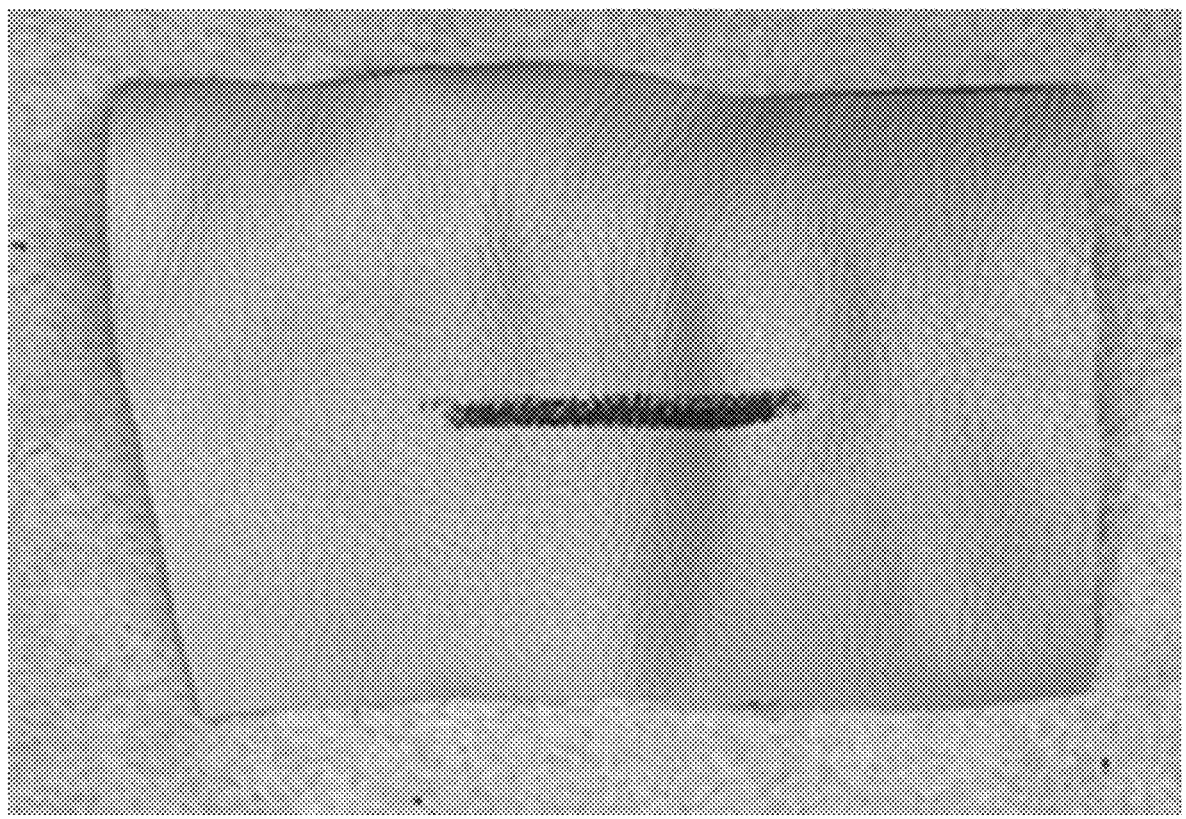
FIG. 5A depicts a white leather surface covered with lipstick before application of a composition in accordance with the present disclosure.
Figure 5B:
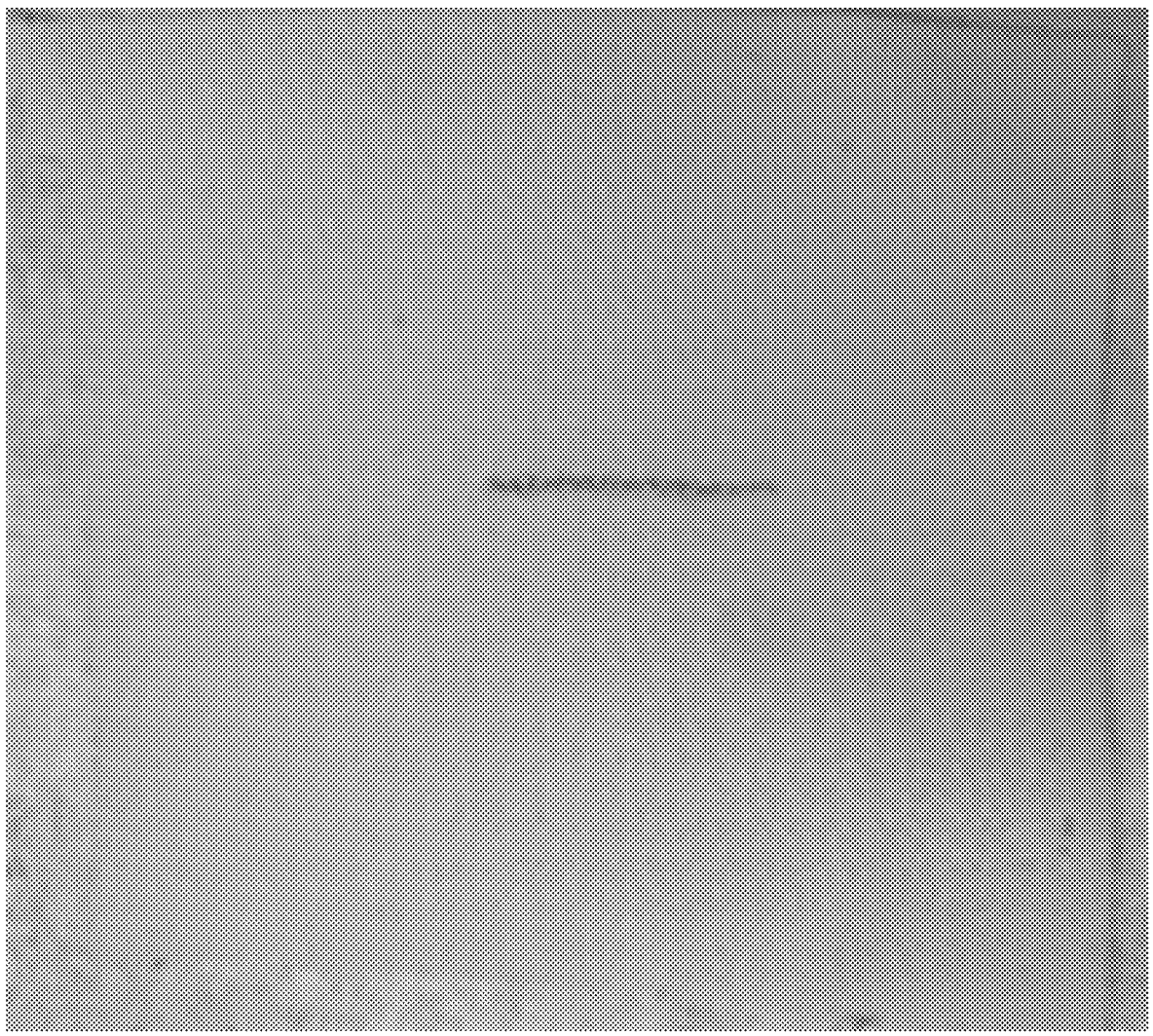
FIG. 5B depicts a white leather surface slightly covered with lipstick after application of a composition in accordance with the present disclosure.
Figure 5C:
FIG. 5C depicts a white leather surface covered with lipstick after application of water.
Figure 6A:
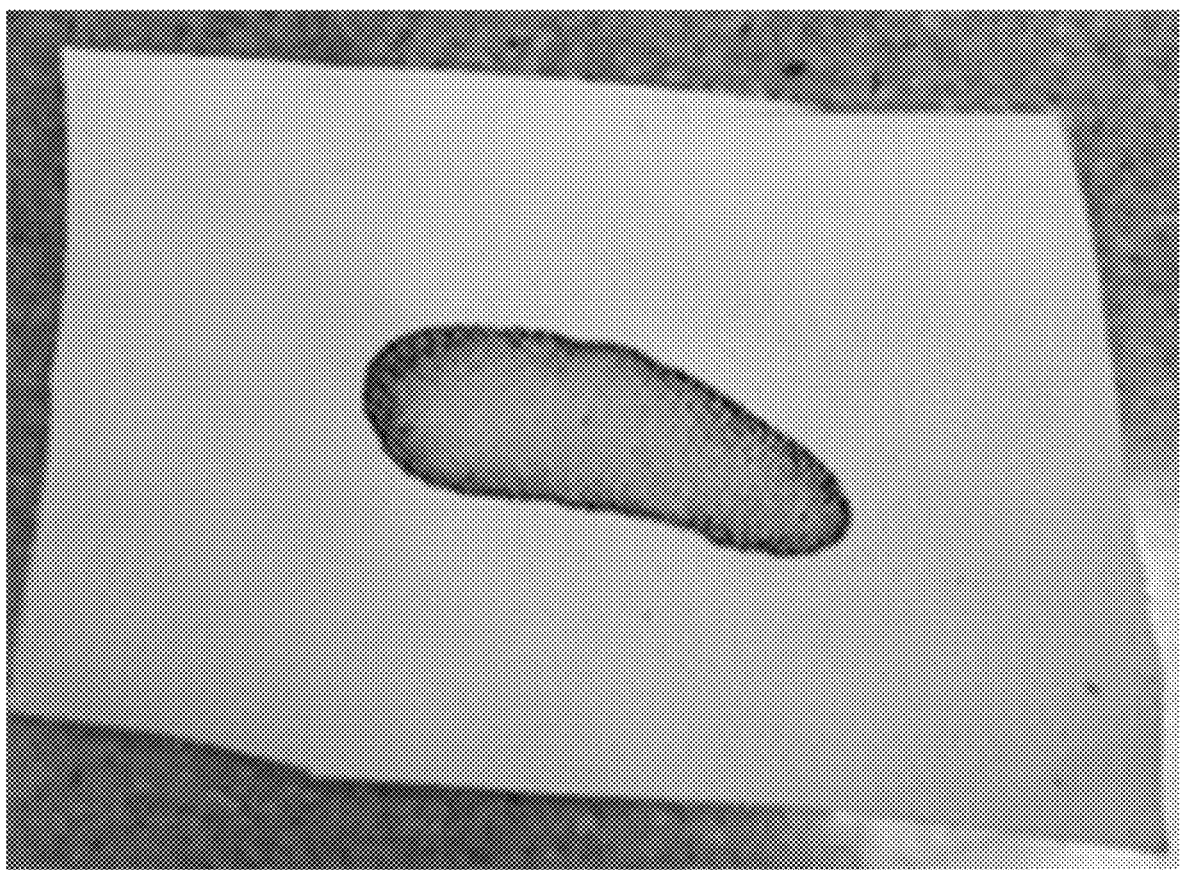
FIG. 6A depicts a white leather surface covered with coffee before application of a composition in accordance with the present disclosure.
Figure 6B:
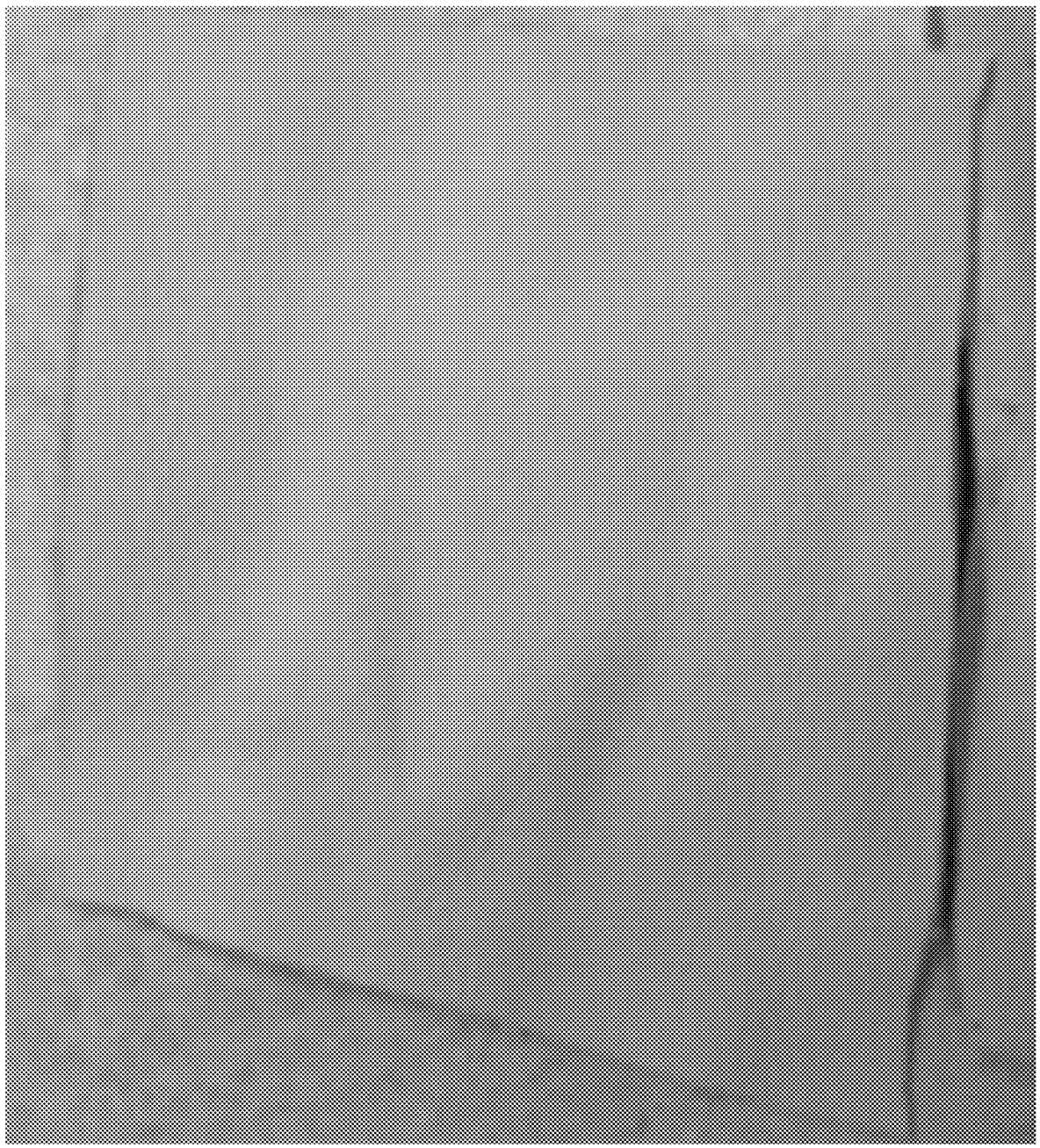
FIG. 6B depicts a white leather surface not covered with coffee after application of a composition in accordance with the present disclosure.
Figure 6C:
FIG. 6C depicts a white leather surface slightly covered with coffee after application of water.
Figure 7A:
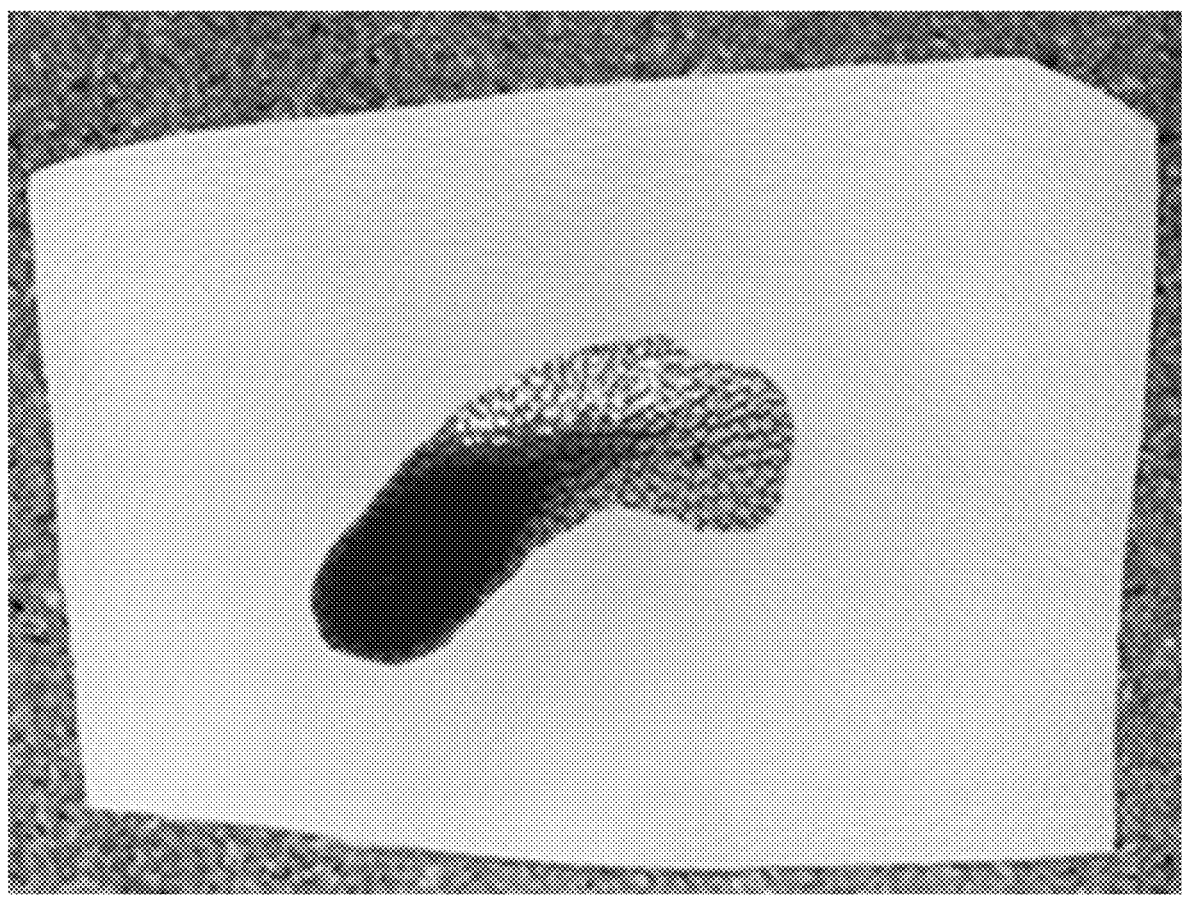
FIG. 7A depicts a white leather surface covered with a flavored drink before application of a composition in accordance with the present disclosure.
Figure 7B:
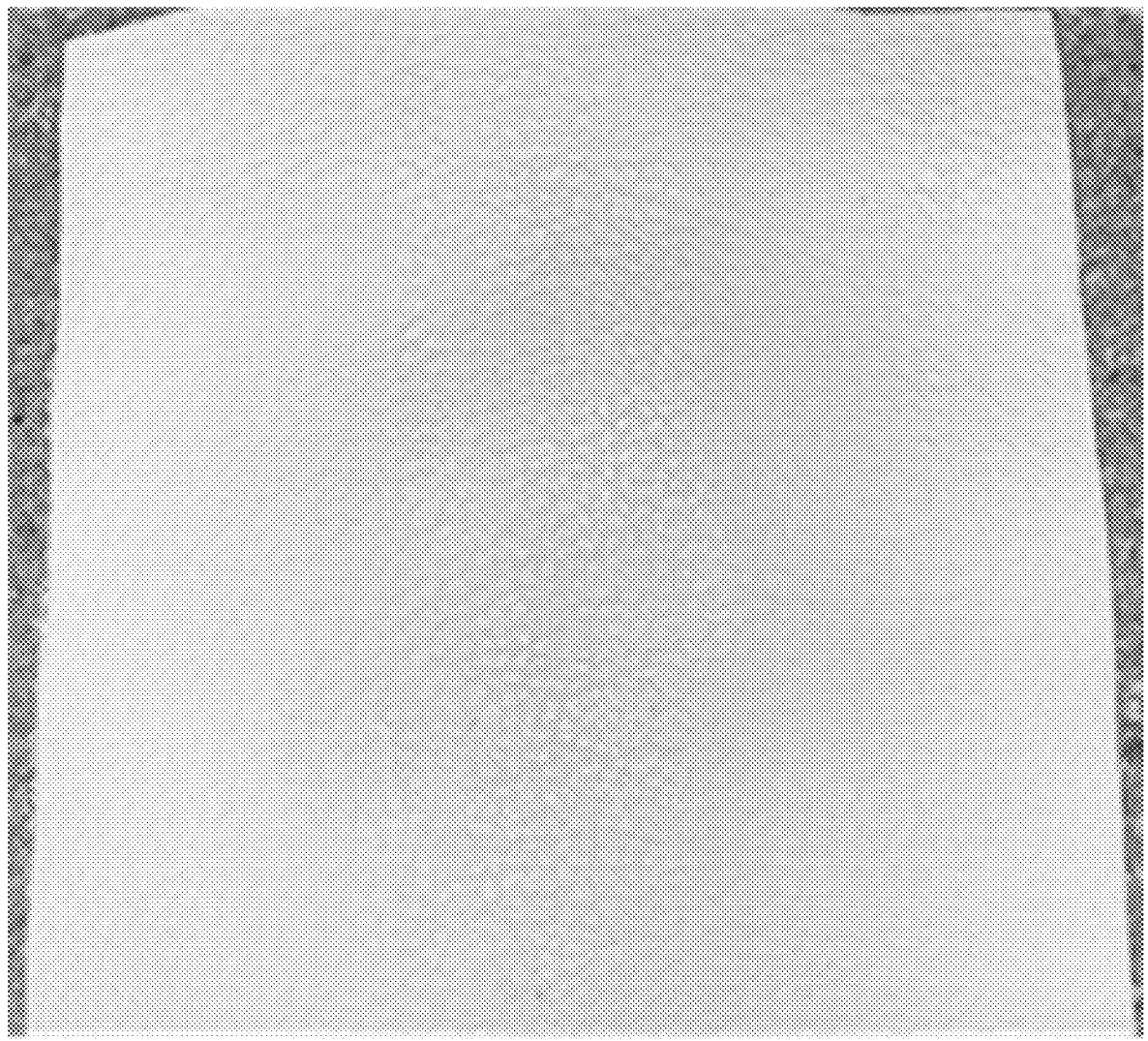
FIG. 7B depicts a white leather surface not covered with a flavored drink after application of a composition in accordance with the present disclosure.
Figure 7C:
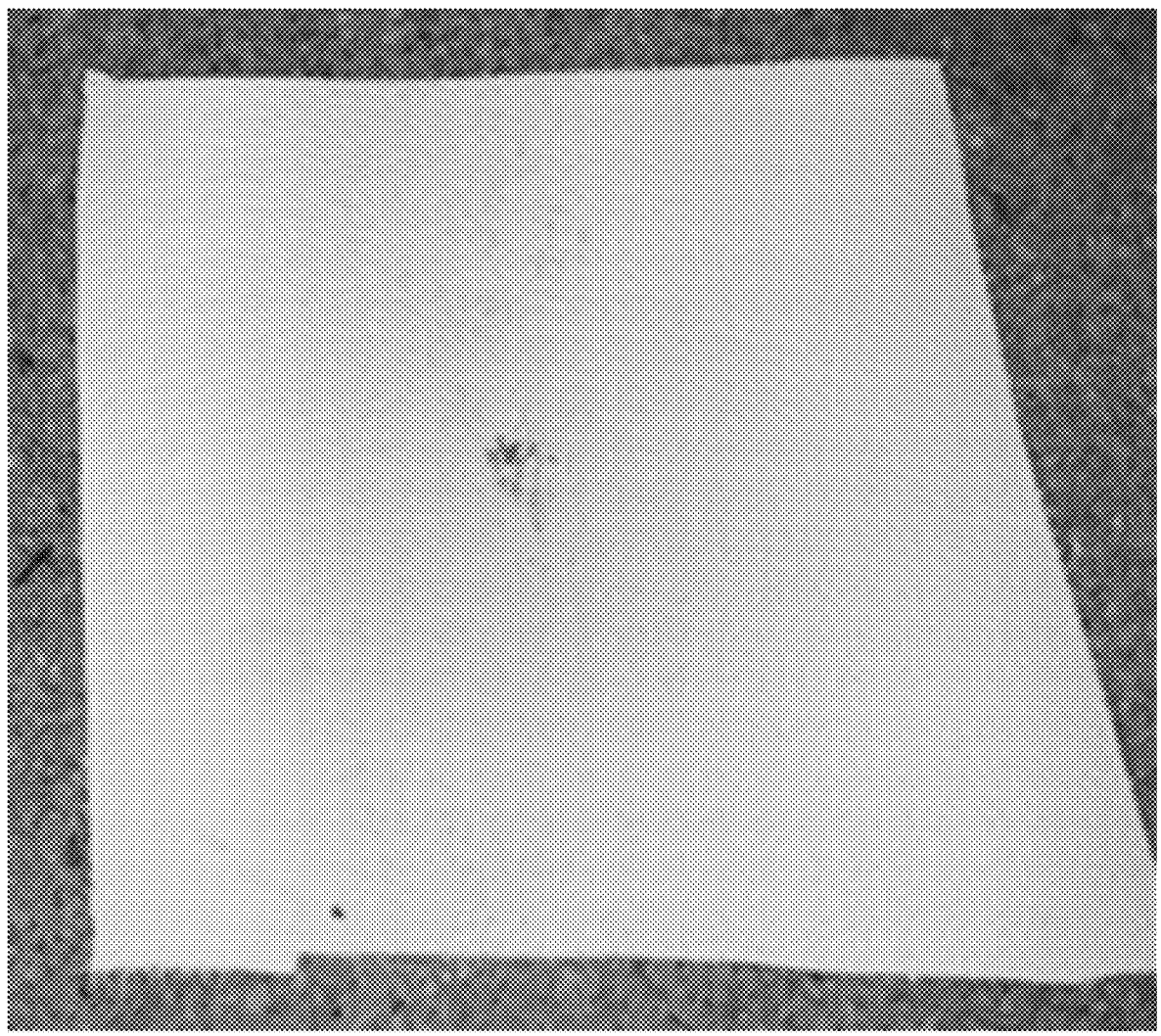
FIG. 7C depicts a white leather surface slightly covered with a flavored drink after application of water.
Figure 8A:
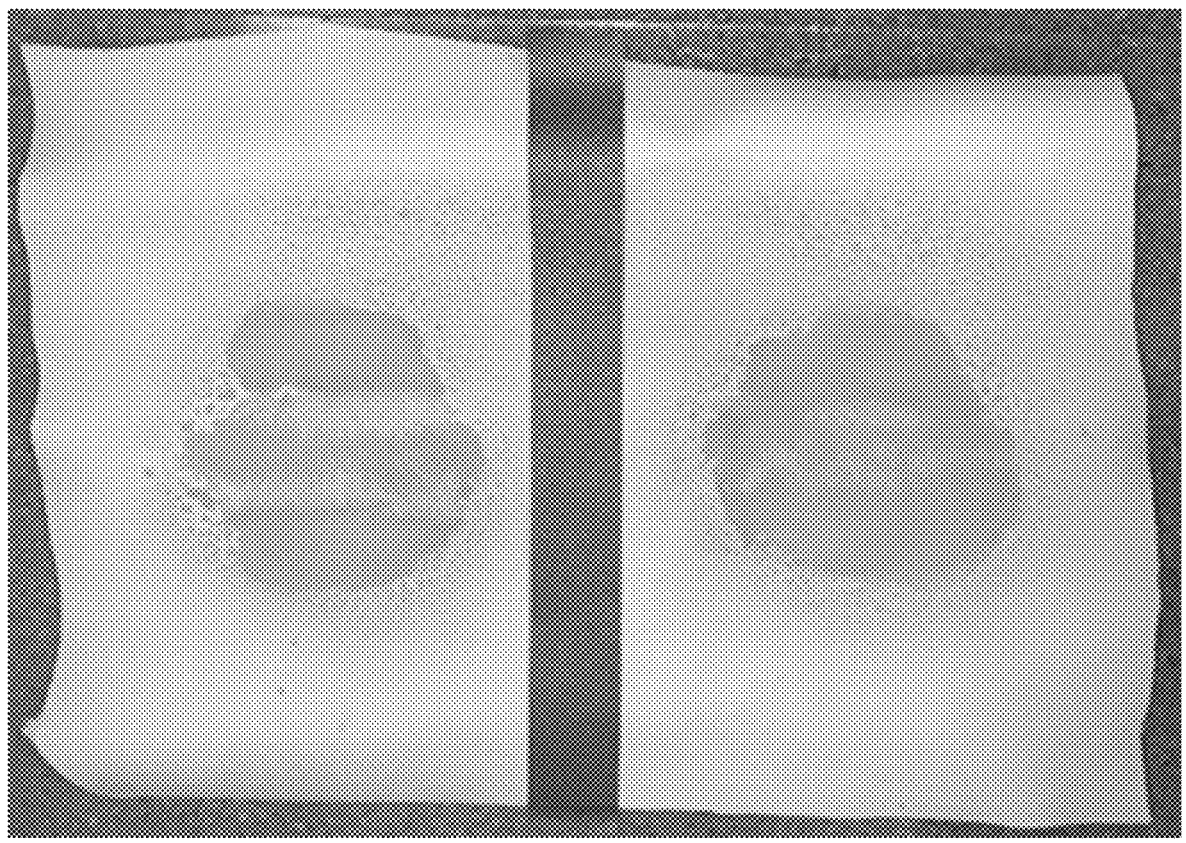
FIG. 8A depicts a white leather surface covered with black charm clay/dirt/grime with the right side of the tape pre-treated with composition and the left side of the tape left untreated.
Figure 8B:
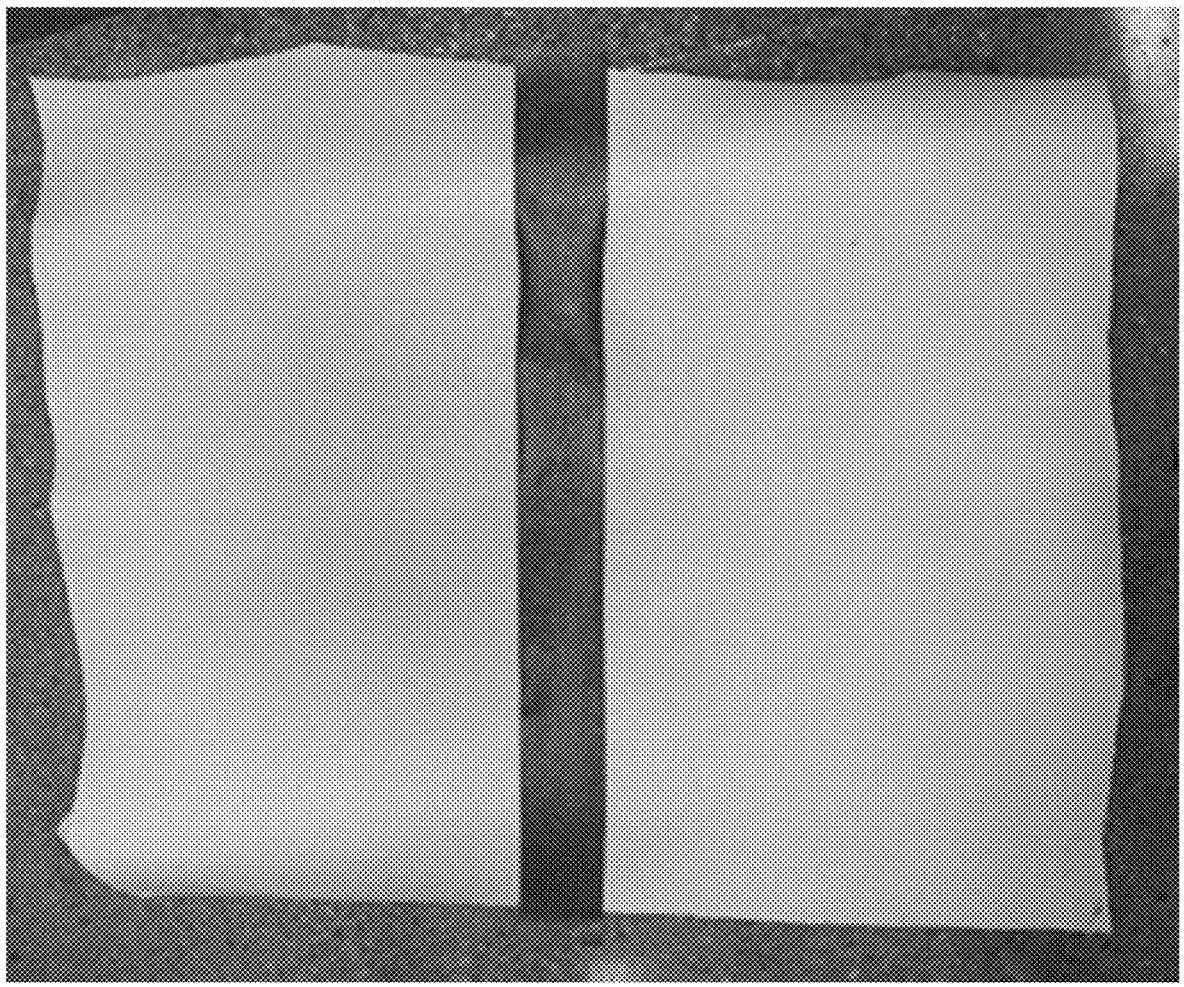
FIG. 8B depicts a white leather surface not covered with black charm clay/dirt/grime after application of water.
Figure 9A:
FIG. 9A depicts a white leather surface covered with cola.
Figure 9B:
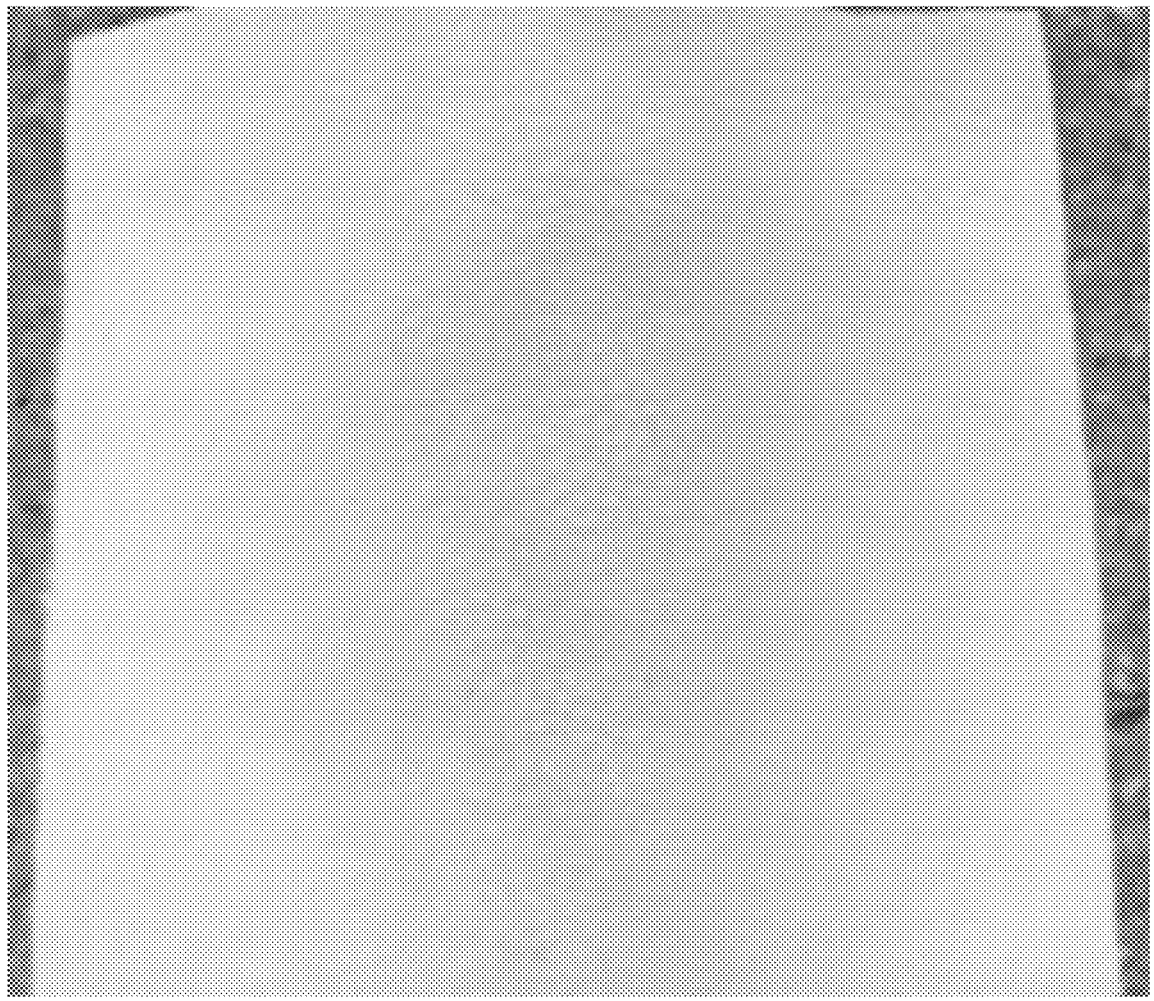
FIG. 9B depicts a white leather surface that was pre-treated with composition, not covered with cola after application of water.
Figure 9C:
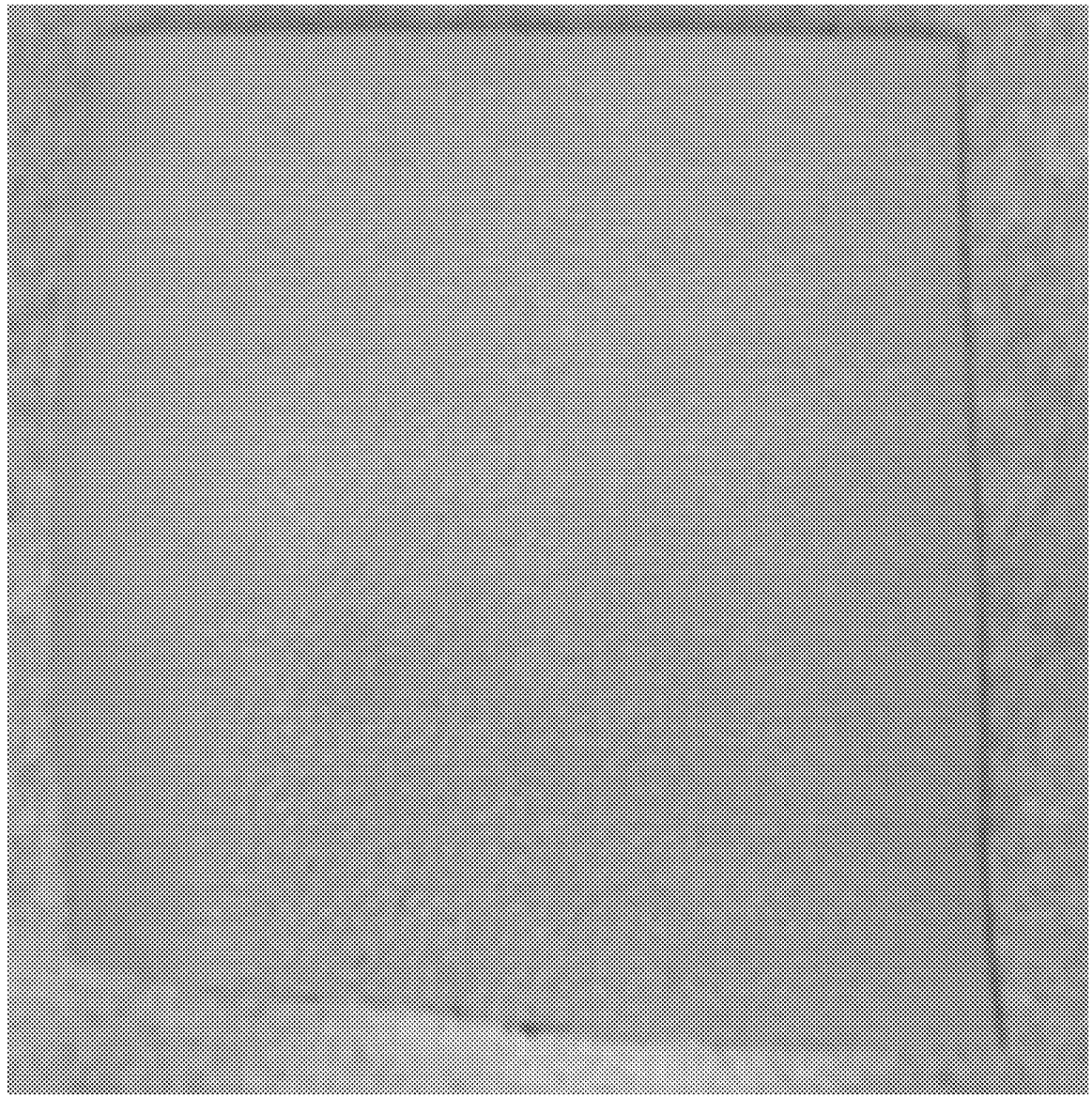
FIG. 9C depicts an untreated white leather surface not covered with a cola after application of water.
Figure 10A:
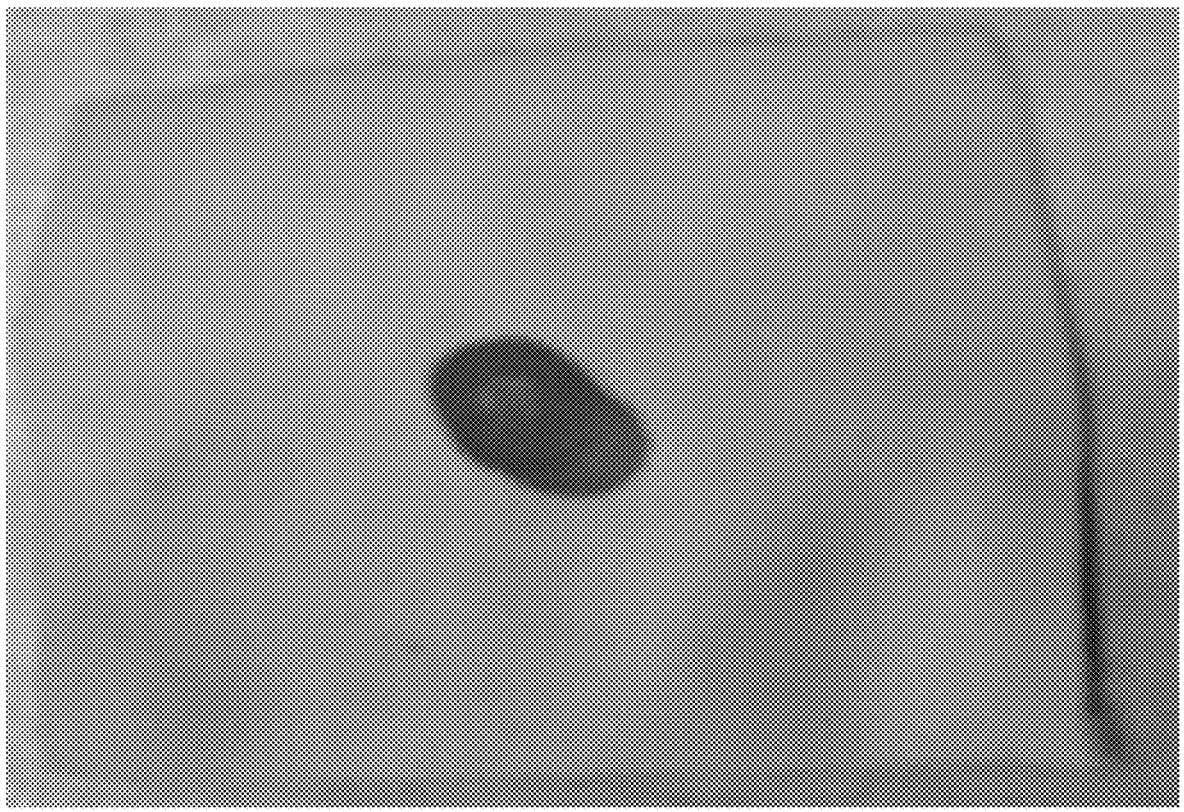
FIG. 10A depicts a white leather surface covered with foundation/makeup.
Figure 10B:
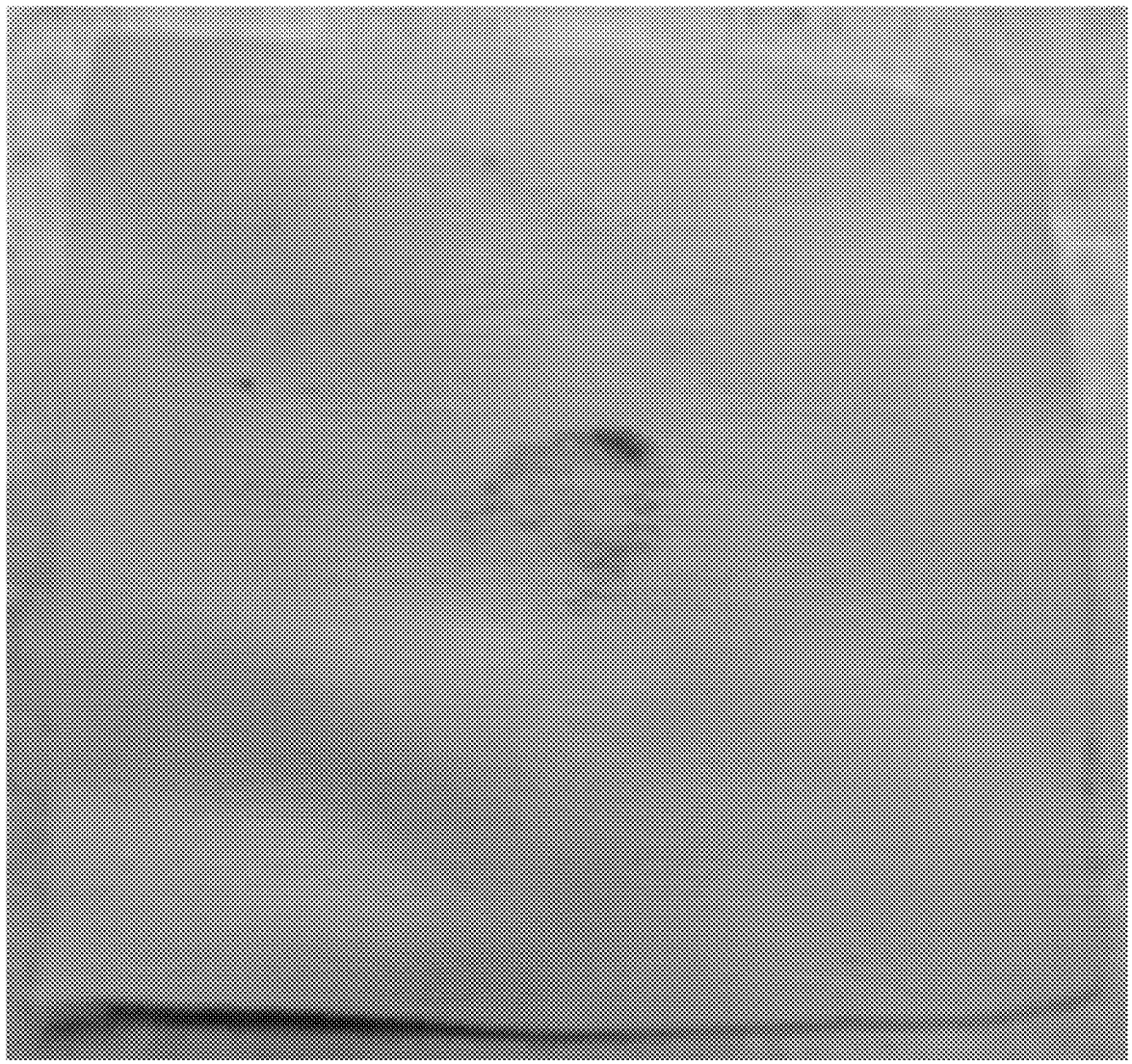
FIG. 10B depicts a white leather surface that was pre-treated with composition, slightly covered with foundation/makeup after application of water.
Figure 10C:
FIG. 10C depicts an untreated a white leather surface covered with foundation/makeup after application of water.
Figure 11A:
FIG. 11A depicts a white leather surface covered with coffee.
Figure 11B:
FIG. 11B depicts a white leather surface that was pre-treated with composition, not covered with coffee after application of water.
Figure 11C:
FIG. 11C depicts an untreated a white leather surface slightly covered with coffee after application of water.
Figure 12A:
FIG. 12A depicts a white leather surface covered with lipstick.
Figure 12B:
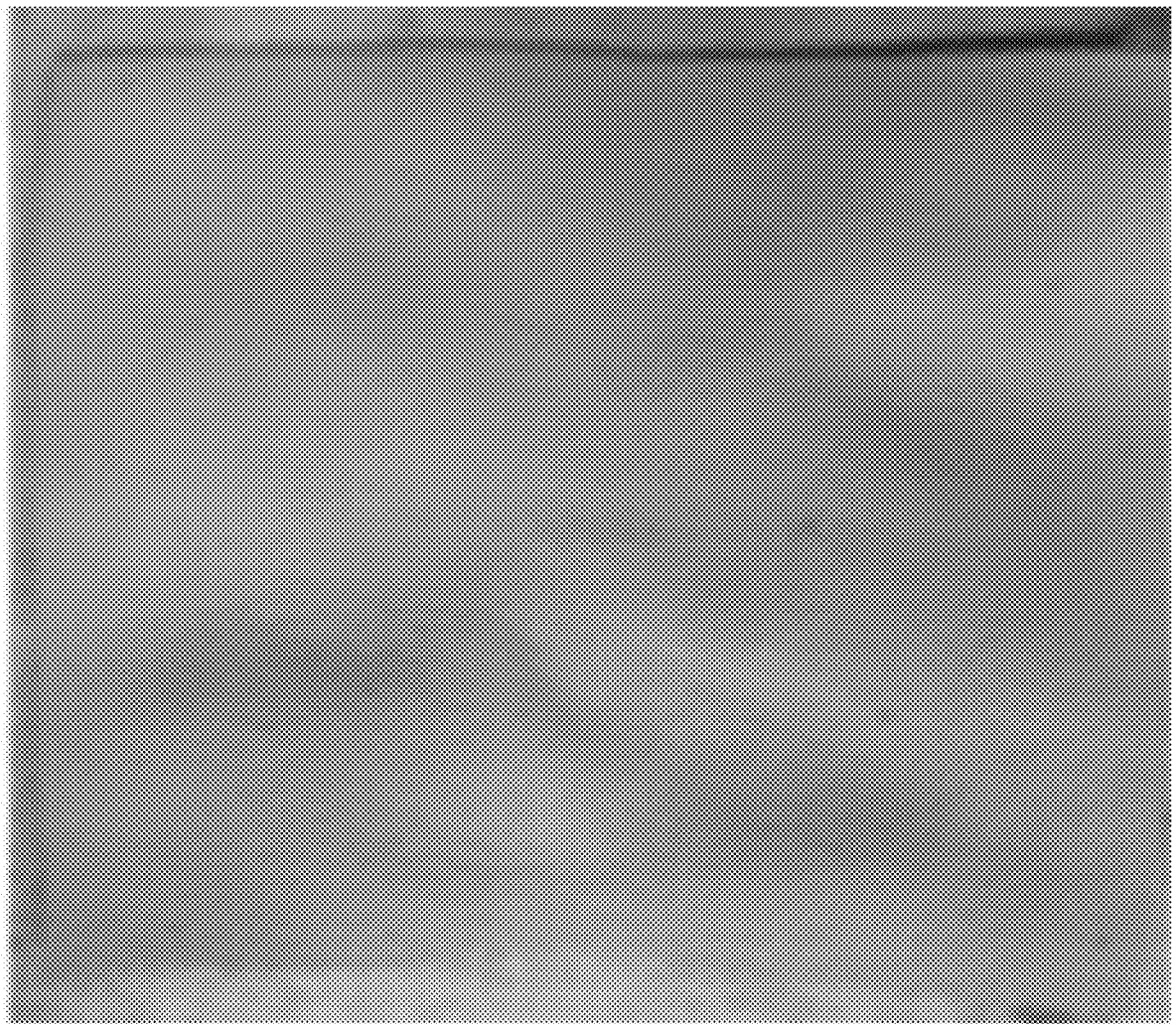
FIG. 12B depicts a white leather surface that was pre-treated with composition, very slightly covered with lipstick after application water.
Figure 12C:
FIG. 12C depicts an untreated white leather surface covered with lipstick after application of water.
Figure 13A:
FIG. 13A depicts a white leather surface covered with an energy drink.
Figure 13B:
FIG. 13B depicts a white leather surface that was pre-treated with composition, not covered with an energy drink after application of water.
Figure 13C:
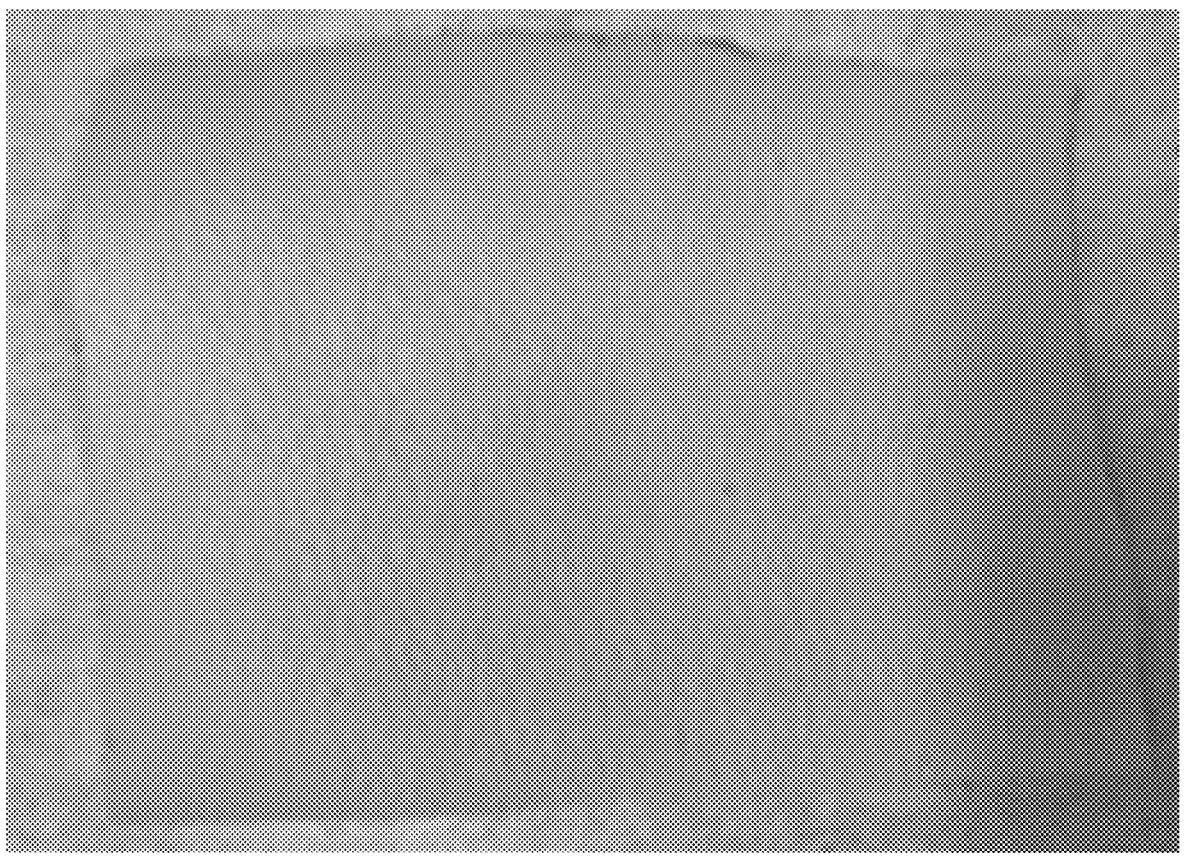
FIG. 13C depicts an untreated white leather surface not covered with an energy drink after application of water.
Figure 14:
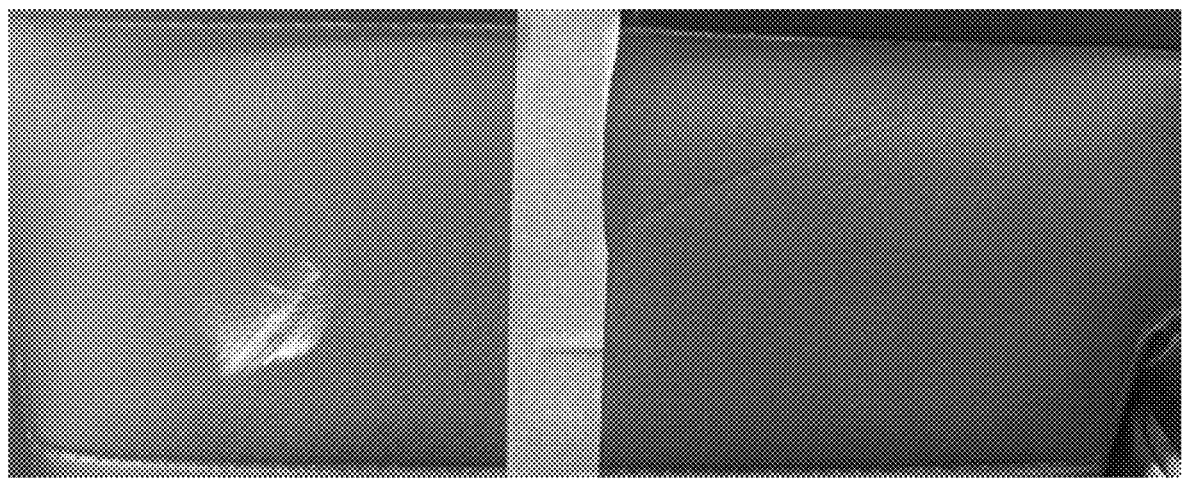
FIG. 14 depicts a black leather with right side of the tape pre-treated with composition and left side of tape left untreated. The left side of the tape is still covered with sunscreen after application of water. The right side of the tape is not covered with sunscreen after application of water.
Figure 15:
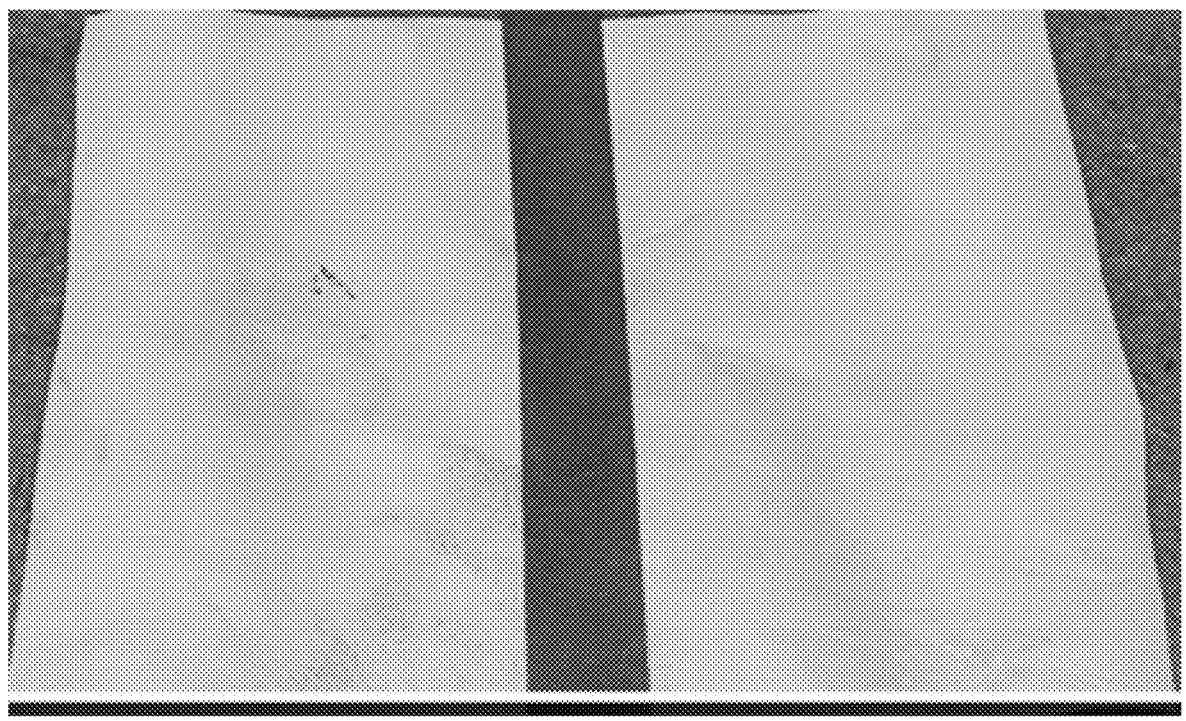
FIG. 15 depicts a white leather surface with the right side of the tape pre-treated with composition in accordance with the present disclosure and the left side of tape left untreated. The left side of the tape is slightly covered with a flavored drink after application of water. The right side of the tape is not covered with a flavored drink after application of water.
Figure 16:
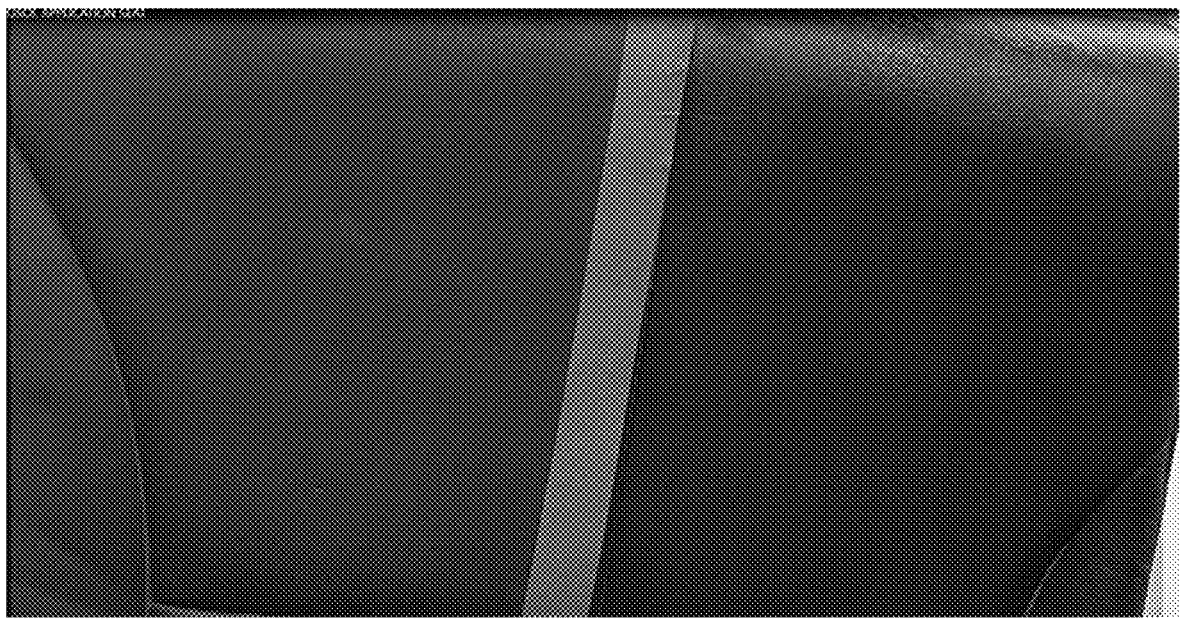
FIG. 16 depicts a black leather surface before application of a composition in accordance with the present disclosure (left side of the tape) and a black leather surface after application of a composition in accordance with the present disclosure (right side of the tape).
Figure 17:
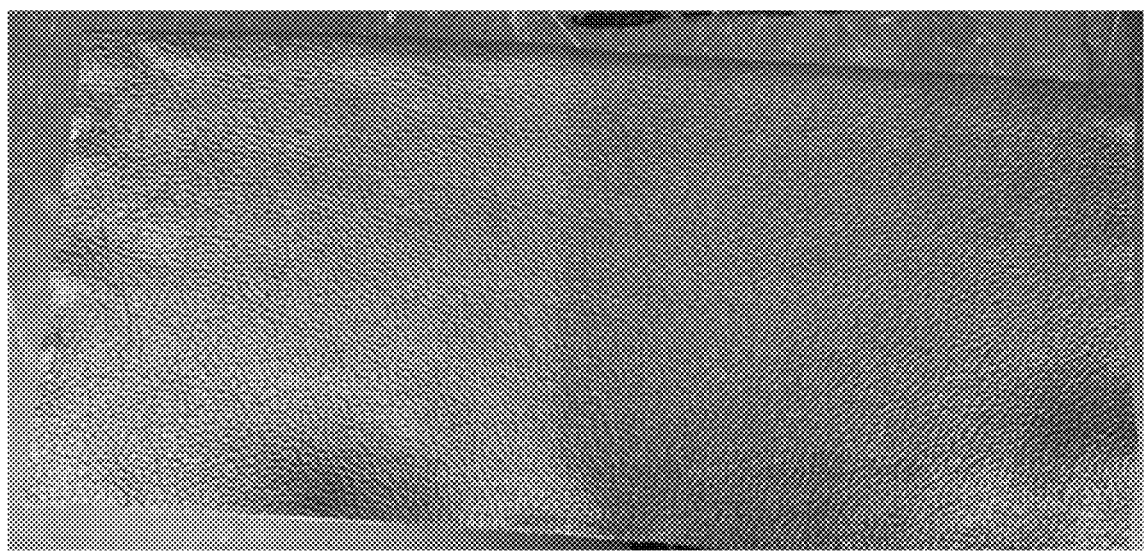
FIG. 17 depicts a brown leather surface before application of a composition in accordance with the present disclosure (left side of the tape) and a brown leather surface after application of a composition in accordance with the present disclosure (right side of the tape).
Figure 18:
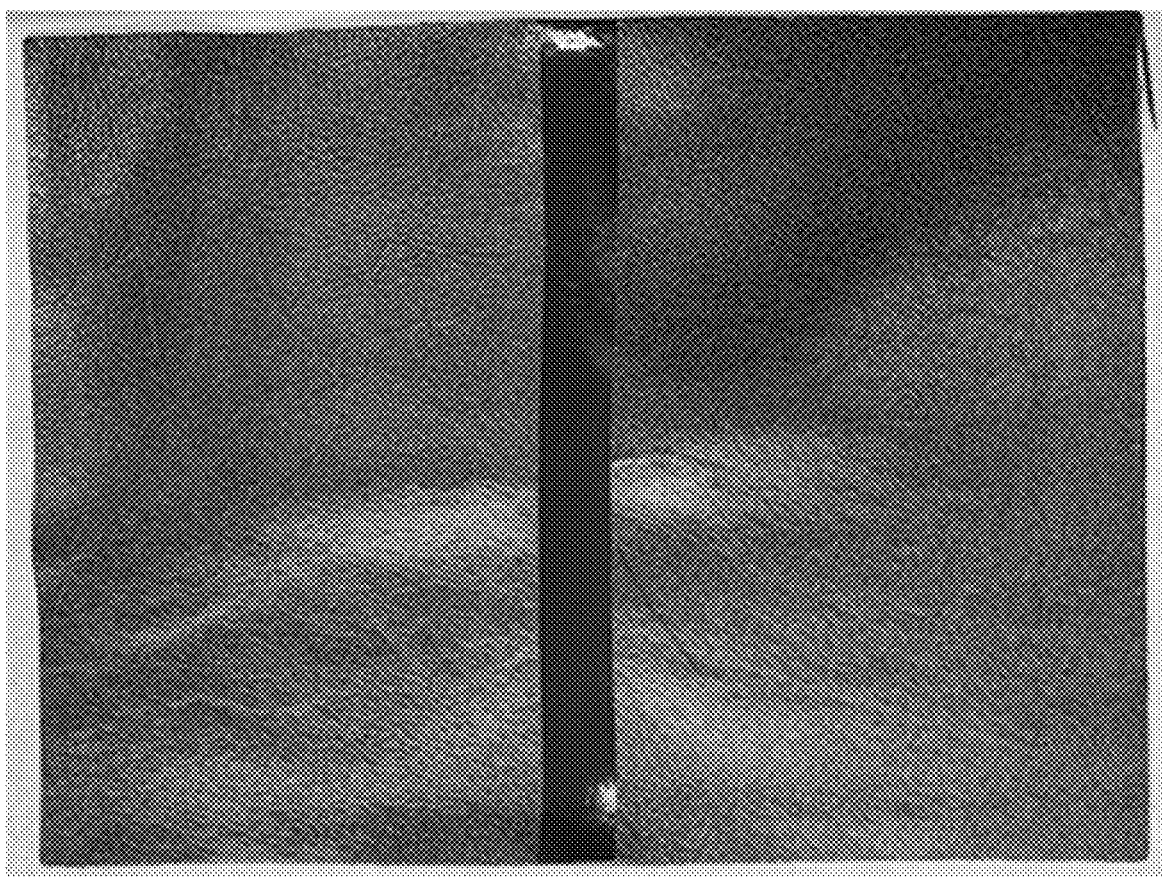
FIG. 18 depicts a red leather surface before application of a composition in accordance with the present disclosure (left side of the tape) and a red leather surface after application of a composition in accordance with the present disclosure (right side of the tape).
Figure 19:
FIG. 19 depicts a green leather surface before application of a composition in accordance with the present disclosure (left side of the tape) and a green leather surface after application of a composition in accordance with the present disclosure (right side of the tape).
Figure 20:
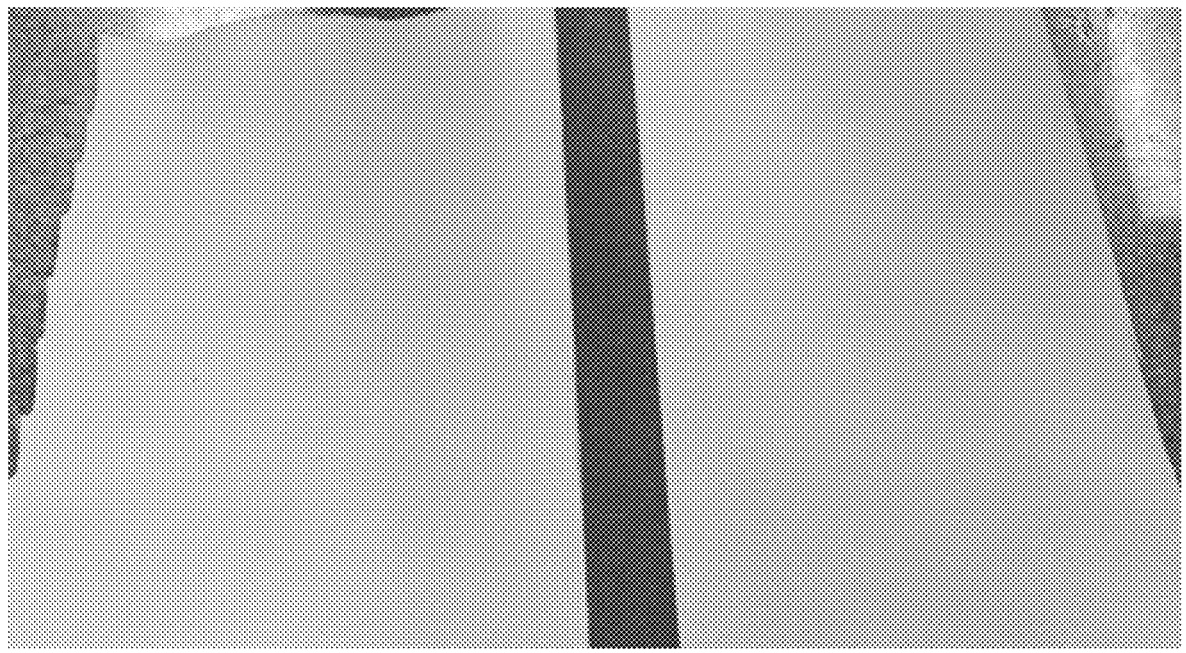
FIG. 20 depicts a white leather surface before application of a composition in accordance with the present disclosure (left side of the tape) and a white leather surface after application of a composition in accordance with the present disclosure (right side of the tape).
Figure 21:
FIG. 21 depicts a black perforated leather surface before application of a composition in accordance with the present disclosure (left side of the tape) and a black perforated leather surface after application of a composition in accordance with the present disclosure (right side of the tape).
Figure 22:
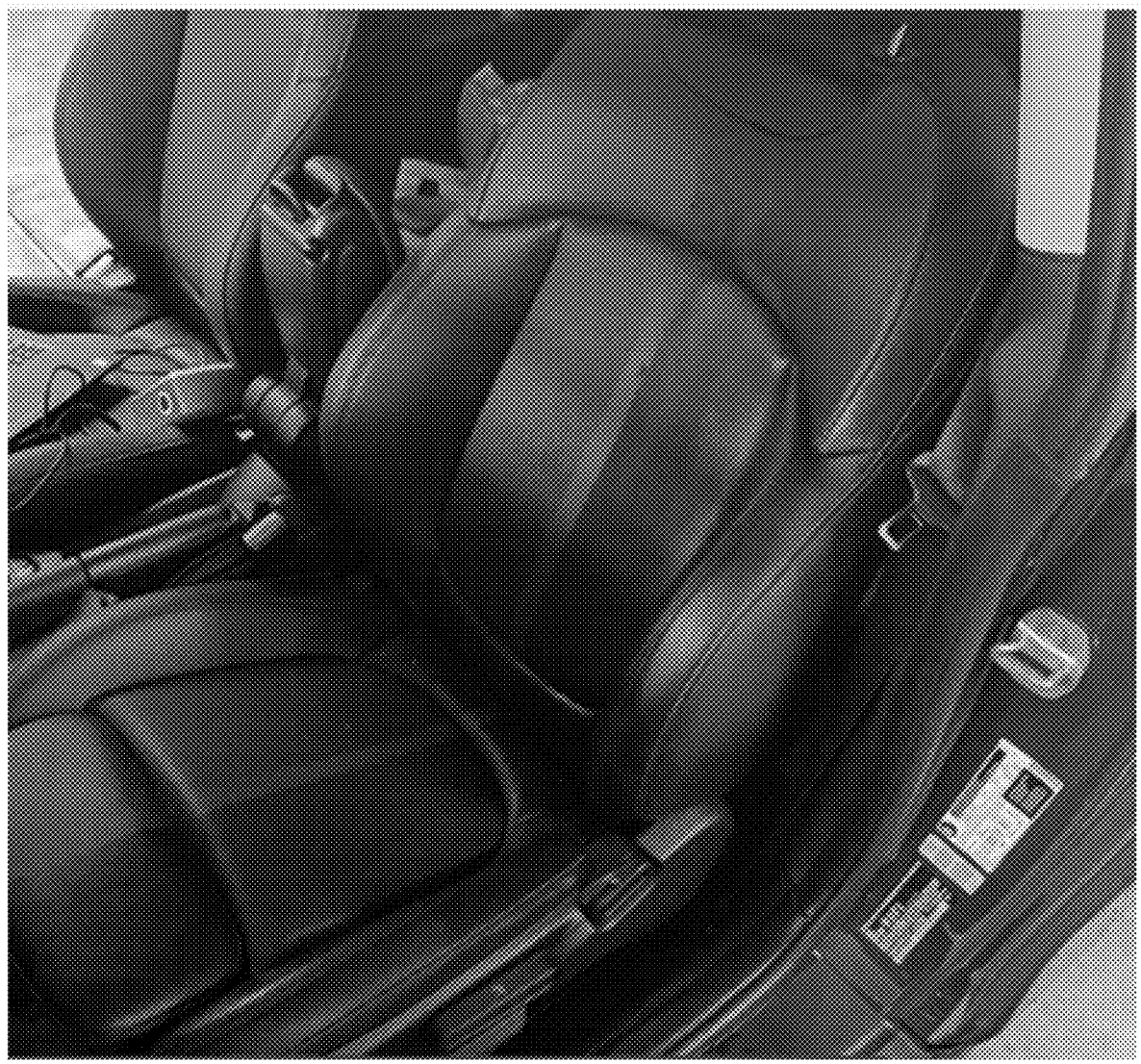
FIG. 22 depicts a black heated leather surface before application of a composition in accordance with the present disclosure (left side of the seat) and a black heated leather surface after application of a composition in accordance with the present disclosure (right side of the seat).

Described herein are compositions and methods for use, for example, in the leather care industry. For example, the compositions of the present disclosure address the need for a leather treatment that is capable to deliver cleaning, protection, and preservation.

In many embodiments, the composition protects surfaces by implementing hydrophobic polymers to repel water and aqueous solutions.

The compositions of the present disclosure provide an improved hydrophobic effect on a leather surface compared to previously known products. The compositions also provide cleaning.

In some embodiments, the composition comprises a cationic amino functional silicone emulsion, a protectant, and a preservative. In some embodiments, the composition is used as part of a method to treat a leather surface by applying the composition to the leather surface.

In some embodiments of the present disclosure, the cationic amino functional silicone emulsion contributes to the hydrophobicity and durability of the composition. In some embodiments, the cationic amino functional silicone emulsion comprises an aminoalkyl-functional organopolysiloxane fluid and water. In some embodiments, the cationic amino functional silicone emulsion comprises a non-ionic emulsifier. In some embodiments, the cationic amino functional silicone emulsion comprises water. In some embodiments, the aminoalkyl-functional organopolysiloxane fluid is selected from the group consisting of an amine-alkyl/dimethyl copolymer, a polar amine/alkyl functional block, an amine/alkoxy end-blocked silicone, and combinations thereof. In some embodiments, the cationic amino functional silicone emulsion is selected from the group consisting of APS-385B, Siltech E-4135, LK-Primasoft Power, ICM EM 1616, and combinations thereof.

In some embodiments, the amino functional silicone emulsion has a pH of from about 3 to about 6. In some embodiments, the amino functional silicone emulsion has a pH of from about 5 to about 6. In some embodiments, the amino functional silicone emulsion starts to destabilize at higher pH, such as a range of 10 and above, and/or by using strong alkaline agents.

In some embodiments, the compositions do not comprise a base to modify the pH.

In some embodiments, the cationic amino functional silicone emulsion is soluble in water. In some embodiments, the cationic amino functional silicone emulsion is present in an amount of from about 0.1%, about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, or about 19% to about 0.5%, about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, or about 20%, by weight of the composition.

In some embodiments, the cationic amino functional silicone emulsion is present in an amount of from about 0.1% to about 20%, by weight of the composition. In some embodiments, the cationic amino functional silicone emulsion is present in an amount of from about 0.1% to about 12%, by weight of the composition. In some embodiments, the cationic amino functional silicone emulsion is present in an amount of from about 0.1% to about 6%, by weight of the composition. In some embodiments, the cationic amino functional silicone emulsion is present in an amount of from about 6% to about 12%, by weight of the composition.

In some embodiments, the preservative is present in an amount of from about 0.01%, about 0.05%, about 0.1%, about 0.15%, about 0.20%, about 0.21%, about 0.22%, about 0.23%, about 0.24%, or about 0.25% to about 0.1%, about 0.15%, about 0.2%, about 0.21%, about 0.22%, about 0.23%, about 0.24%, about 0.25%, about 0.3%, about 0.35%, about 0.4%, about 0.45%, or about 0.5%, by weight of the composition.

In some embodiments, the preservative is present in an amount of from about 0.01% to about 0.5%, by weight of the composition. In some embodiments, the preservative is present in an amount of from about 0.1% to about 0.25%, by weight of the composition. In some embodiments, the preservative is present in an amount of from about 0.22% to about 0.25%, by weight of the composition.

Generally, the preservative may be any suitable preservative known in the art. In many embodiments, the preservative is not a formaldehyde donor. In some embodiments, the preservative is selected from the group consisting of Troyguard BC11, Uniquat QAC 50, and combinations thereof.

In some embodiments, the composition comprises a protectant.

In some embodiments, the protectant is present in an amount of from about 0.01%, about 0.05%, about 0.1%, about 0.15%, about 0.20%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, or about 0.95% to about 0.01%, about 0.05%, about 0.1%, about 0.15%, about 0.20%, about 0.25%, about 0.3%, about 0.35%, about 0.4%, about 0.45%, about 0.5%, about 0.55%, about 0.6%, about 0.65%, about 0.7%, about 0.75%, about 0.8%, about 0.85%, about 0.9%, about 0.95%, or about 1%, by weight of the composition.

In some embodiments, the protectant is present in an amount of from about 0.01% to about 0.5%, by weight of the composition. In some embodiments, the protectant is present in an amount of from about 0.1% to about 0.25%, by weight of the composition. In some embodiments, the protectant is present in an amount of from about 0.22% to about 0.25%, by weight of the composition.

In some embodiments, the protectant is a UV protectant. Generally, the UV protectant may be any suitable UV protectant known in the art. The UV protectant must be water soluble. In many embodiments, the protectant is a non-basic aminoether (NOR) hindered amine light stabilizer (HALS). In some embodiments, the UV protectant is selected from the group consisting of Tinuvin 123-DW, Masurf UV 150, Masurf UV 250, Tinuvin 400-DW, Tinuvin 477-DW, Tinuvin 479-DW, Tinuvin 9945-DW, and combinations thereof. In some embodiments, the UV protectant is Tinuvin 123-DW.

In some embodiments, the composition further comprises water. In some embodiments, the water is present in an amount of from about 65% to about 95% from about 70% to about 90%, from about 70% to 85%, or about 82% by weight of the composition.

In some embodiments, the composition further comprises a propellant. In some embodiments, the propellant is present in an amount of from about 0.5% to about 15%, from about 2% to about 10%, from about 3 to about 7%, or about 6%, by weight of the composition. In some embodiments, the propellant is A-70 propellant.

In some embodiments, the composition further comprises a surfactant. In some embodiments, the composition comprises a surfactant in an amount in the range of from about 0.5% to about 3%, by weight of the composition. In some embodiments, the composition comprises a surfactant selected from the group consisting of Tomadol 900, Berol 226, Tomadol 91-6, and combinations thereof.

In some embodiments, the composition further comprises a solvent. In some embodiments, the composition comprises a solvent in an amount in the range of from about 2% to about 12%, by weight of the composition. In some embodiments, the composition comprises an isopropanol solvent.

In some embodiments of the present disclosure, the composition consists essentially of a cationic amino functional silicone emulsion, a protectant, a preservative, water, and optionally a propellant. As used herein, consisting essentially of means that the composition optionally comprises small amounts of impurities. These impurities may be, for example, salts, minerals, metals, dissolved and/or suspended solids, and combinations thereof.

In some embodiments of the present disclosure, the composition consists of a cationic amino functional silicone emulsion, a protectant, a preservative, water, and optionally a propellant.

In some embodiments of the present disclosure, the composition is applied to a leather surface. In some embodiments, the leather surface is selected from the group consisting of a colored leather surface, an uncolored leather surface, a textured leather surface, a smooth leather surface, an automotive leather surface, a non-automotive leather surface, and combinations thereof.

In some embodiments of the present disclosure, the composition is applied to a non-leather surface. In some embodiments, the non-leather surface is selected from the group consisting of wheels, rims, paint, glass, and combinations thereof.

In some embodiments, the composition is a fluid, such as a liquid, and the liquid is applied by the means of an aerosol, a wipe, a trigger sprayer, a sponge, a microfiber cloth, and combinations thereof. In some embodiments, the composition is sprayed on a leather surface and then wiped off the leather surface.

EXAMPLES

Without further elaboration, it is believed that one skilled in the art using the preceding description can utilize the present invention to its fullest extent. The following Examples are, therefore, to be construed as merely illustrative, and not limiting of the disclosure in any way whatsoever.

Example 1: Formulations

A sample composition in accordance with the present disclosure is shown in Table 1. The formulation is a wipes formulation. The formulation does not contain a dye.

TABLE 1

Sample wipes formulation.

| Component | Weight Percent |
| --- | --- |
| Water DI/RO | 93.580 |
| Troyguard BC11 | 0.220 |

TABLE 1-continued

Sample wipes formulation.

| Component | Weight Percent |
|---|---|
| Siltech E-4135 | 6.000 |
| Tinuvin 123-DW | 0.200 |
| Total | 100.000 |

A sample composition in accordance with the present disclosure is shown in Table 2. The formulation is a trigger formulation. It may also be used in an aerosol formula concentrate. The formulation does not contain a dye.

TABLE 2

Sample trigger formulation.

| Component | Weight Percent |
|---|---|
| Water DI/RO | 93.7 |
| Troyguard BC11 | 0.1 |
| Siltech E-4135 | 6.000 |
| Tinuvin 123-DW | 0.200 |
| Total | 100.000 |

A sample composition in accordance with the present disclosure is shown in Table 3. The formulation is an aerosol formulation. The formulation does not contain a dye.

TABLE 3

Sample aerosol formulation.

| Component | Weight Percent |
|---|---|
| Formulation of Table 2 | 94.00 |
| Propellant A-31 | 6.00 |
| Total | 100.000 |

Example 2: Safety and Cleaning

The cleaning performance of compositions in accordance with the present disclosure was measured and rated for a variety of soils on leather. A variety of soils were used on a clean white leather and let to dry overnight. The following day, a damp microfiber cloth was used to clean the stains and rate them. The results are shown in Table 4 and FIGS. 1A-1B, 2A-2C, 3A-3B, 4A-4C, 5A-5C, 6A-6C, and 7A-7C. The rating system is on a scale of 1-5, with 1 being the best (clean) and 5 being the worst (dirty).

TABLE 4

Cleaning test summary.

| Soil | I1 | Control (Water) |
|---|---|---|
| Cola (Coca Cola ®) | 1 | 2 |
| Makeup/Foundation | 3 | 4 |
| Flavored drink (Koolaid ®) | 1 | 2 |
| Energy Drink (Red Bull ®) | 1 | 2 |
| Lipstick | 2 | 3 |
| Coffee | 1 | 3 |
| Black Charm Clay | 1 | 1 |
| Average rating | 1.43 | 2.43 |

Gloss, RGB, and contact angle (CA) were measured on treated leather with compositions in accordance with the present disclosure to show formula safety. Data are shown in Tables 5, 6, and 7.

Gloss was improved with compositions in accordance with the present disclosure. There is no effect for RGB on white leather, but there is slight effect for RGB on black leather. Visually, black leather looks richer in color and glossier, giving it an enhanced look. Therefore, compositions in accordance with the present disclosure are safe to use on leather.

TABLE 5

Gloss test summary.

| 85 degrees only since low gloss | Gloss Before treatment | Stdev | Gloss After treatment | Stdev | % difference |
|---|---|---|---|---|---|
| White leather | 2.3 | — | 4.1 | — | 78.26 |
| Black leather | 3.4 | 0.2 | 4.8 | 0.3 | 41.18 |

TABLE 6

RGB test summary.

| | | Red (R) | | | | Green (G) | | | | Blue (B) | | | |
|---|---|---|---|---|---|---|---|---|---|---|---|---|---|
| | Sample | 1 | 2 | 3 | Average | 1 | 2 | 3 | Average | 1 | 2 | 3 | Average |
| Initial | White Leather | 756 | 756 | 759 | 757.0 | 754 | 756 | 755 | 755.0 | 674 | 696 | 697 | 689.0 |
| | Black Leather | 53 | 54 | 54 | 53.7 | 53 | 54 | 54 | 53.7 | 57 | 58 | 59 | 58.0 |
| After Treatment | White Leather | 736 | 740 | 742 | 739.3 | 739 | 729 | 741 | 736.3 | 631 | 676 | 684 | 663.7 |
| | Black Leather | 48 | 46 | 44 | 46.0 | 48 | 46 | 45 | 46.3 | 51 | 53 | 48 | 50.7 |

TABLE 7

RGB average and percent difference test summary.

| Sample | Avg. red before treatment | Avg. red after treatment | % diff. | Average green before treatment | Average green after treatment | % diff. | Average blue before treatment | Average blue after treatment | % diff. |
|---|---|---|---|---|---|---|---|---|---|
| White leather | 757.0 | 739.3 | 2.33 | 755.0 | 736.3 | 2.47 | 689.0 | 663.7 | 3.68 |
| Black leather | 53.7 | 46.0 | 14.29 | 53.7 | 46.3 | 13.66 | 68.0 | 50.7 | 12.64 |

The results indicate that compositions in accordance with the present disclosure safely clean to remove dirt and grime.

Example 3: Protection from Liquids and Stains

The soil repellency performance of compositions in accordance with the present disclosure was measured and rated for a variety of soils on leather. Clean white leather was treated with a composition in accordance with the present disclosure and let to condition overnight. The next day, a variety of soils were used on the white leather and let to dry overnight. The following day, a damp microfiber cloth was used to clean the stains and rate them. The results are shown in Table 8 and FIGS. 8A-8B, 9A-9C, 10A-10C, 11A-11C, 12A-12C, 13A-13C, 14, and 15. The rating system is on a scale of 1-5, with 1 being the best (clean) and 5 being the worst (dirty).

TABLE 8

Summary of soil repellency.

| Soil | I1 | Control (Water) |
|---|---|---|
| Coca Cola | 1 | 2 |
| Foundation | 2 | 4 |
| Koolaid | 1 | 3 |
| Sunscreen | 1 | 4 |
| Red Bull | 1 | 2 |
| Lipstick | 1 | 3 |
| Coffee | 3 | 3 |
| Average rating | 1.43 | 3 |

The contact angle was measured for treated and untreated leather. The higher the contact angle, the more hydrophobic the leather will be. Contact angle data are shown in Table 9. Treated leather has a higher contact angle than untreated leather, indicating increased hydrophobicity upon treatment.

TABLE 9

Contact angle measurements.

| | CA before treatment (degrees) | CA after treatment (degrees) | % difference treated/ untreated |
|---|---|---|---|
| White leather | 83.91 | 114.32 | 36.24 |
| Black leather | 95.16 | 117.23 | 23.19 |

The results indicate that compositions in accordance with the present disclosure repel stains and liquids. The hydrophobic protective barrier repels dirt and grime and provides easier cleaning. This barrier is invisible and does not compromise the look and/or feel of the leather.

Example 4: Suitable for Leather Surfaces of Different Color and Texture

The appearance performance of compositions in accordance with the present disclosure was measured and tested for a variety of leather surfaces. A composition in accordance with the present disclosure was applied three times on one side of a leather piece, while the other side was left untreated. The feel of leather was rated on a scale of 1-5, with 1 being the best (normal leather feel) and 5 being the worst (feel unlike leather).

Compositions in accordance with the present disclosure worked well on all leather colors tested, as well as on perforated and heated seats. The results are shown in FIGS. 16-22 and Table 10. In each case, the finish applied to the leather had a non-greasy look and feel. The feel of the leather was not compromised. The compositions did not leave behind a hard film at all. The leather feels good after treatment.

TABLE 10

Touch test.

| Participant | Rating |
|---|---|
| 1 | 1 |
| 2 | 1 |
| 3 | 1 |
| 4 | 1 |
| 5 | 2 |
| Average | 1.2 |

Example 5: Length of Life

Length of life measurements were made on actual leather seats. Contact angle and appearance of leather was monitored.

A passenger seat of a vehicle was fully coated with two coats of a composition in accordance with the present disclosure. Contact angle was measured. Data are shown in Table 11. After 2 weeks, contact angle was still 10.5 degrees greater than untreated leather, indicating that ceramic coating is still present 2 weeks after treatment.

TABLE 11

Length of life test.

| Sample | Average Contact Angle (degrees) | Standard Deviation (degrees) |
|---|---|---|
| Week 0 Untreated | 52.87 | 0.47 |
| Week 0 Treated | 67.25 | 1.02 |

TABLE 11-continued

Length of life test.

| Sample | Average Contact Angle (degrees) | Standard Deviation (degrees) |
|---|---|---|
| Week 1 Treated | 64.98 | 0.64 |
| Week 2 Treated | 63.43 | 0.98 |

Example 6: Formulations

Figure 23:
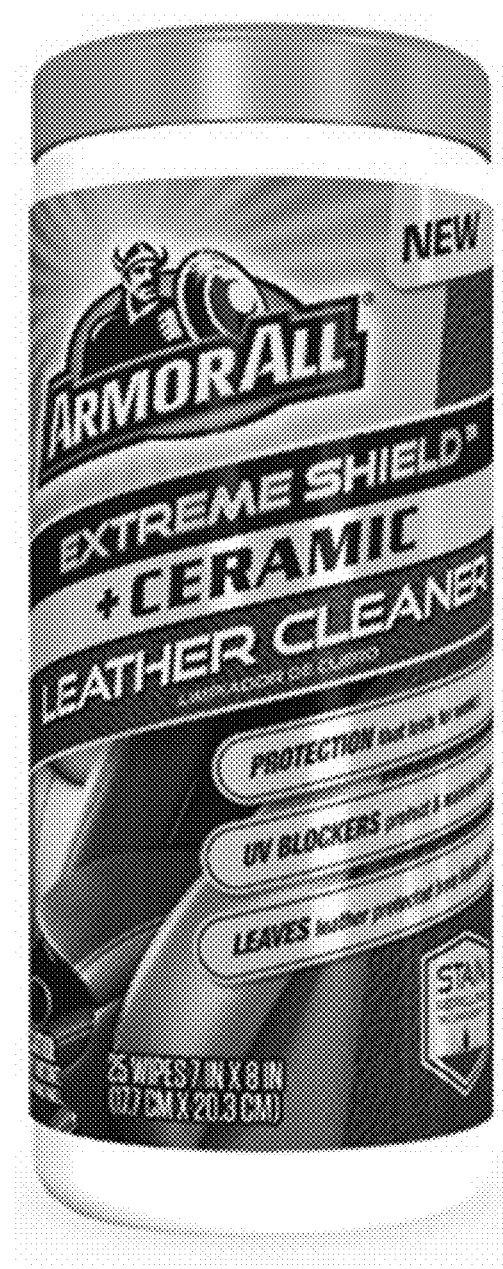
FIG. 23 depicts a composition in accordance with the present disclosure in the form of a wipe formulation.
Figure 24:
FIG. 24 depicts a composition in accordance with the present disclosure in the form of a trigger formulation.
Figure 25:
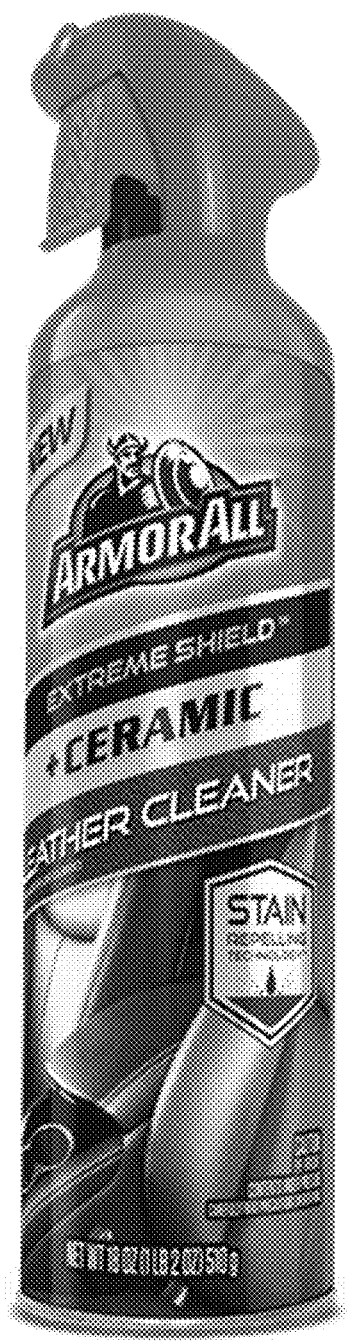
FIG. 25 depicts a composition in accordance with the present disclosure in the form of an aerosol formulation.
Figure 27:
FIG. 27 depicts a summary of the benefits of compositions in accordance with the present disclosure.

Compositions in accordance with the present disclosure may be in a variety of forms and formulations. A wipe product is shown in FIG. 23. A trigger product is shown in FIG. 24. An aerosol product is shown in FIG. 25. Summaries of the benefits of these formulations are shown in FIGS. 26 and 27.

This written description uses examples to illustrate the present disclosure, including the best mode, and also to enable any person skilled in the art to practice the disclosure, including making and using any compositions or systems and performing any incorporated methods. The patentable scope of the disclosure is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

As used herein, the terms "comprises," "comprising," "includes," "including," "has," "having," "contains", "containing," "characterized by" or any other variation thereof, are intended to cover a non-exclusive inclusion, subject to any limitation explicitly indicated. For example, a composition, mixture, process or method that comprises a list of elements is not necessarily limited to only those elements but may include other elements not expressly listed or inherent to such composition, mixture, process or method.

The transitional phrase "consisting of" excludes any element, step, or ingredient not specified. If in the claim, such would close the claim to the inclusion of materials other than those recited except for impurities ordinarily associated therewith. When the phrase "consisting of" appears in a clause of the body of a claim, rather than immediately following the preamble, it limits only the element set forth in that clause; other elements are not excluded from the claim as a whole.

The transitional phrase "consisting essentially of" is used to define a composition or method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of".

Where an invention or a portion thereof is defined with an open-ended term such as "comprising," it should be readily understood that (unless otherwise stated) the description should be interpreted to also describe such an invention using the terms "consisting essentially of" or "consisting of."

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e. occurrences) of the element or component. Therefore "a" or "an" should be read to include one or at least one, and the singular word form of the element or component also includes the plural unless the number is obviously meant to be singular.

As used herein, the term "about" means plus or minus 10% of the value.

What is claimed is:

1. A composition comprising:
   a cationic amino functional silicone emulsion in an amount of about 0.1% to about 15% by weight of the composition; and
   a protectant, wherein the protectant is a hindered amine light stabilizer (HALS);
   and optionally a preservative.

2. The composition of claim 1, wherein the cationic amino functional silicone emulsion comprises an aminoalkyl-functional organopolysiloxane fluid and water.

3. The composition of claim 1, wherein the cationic amino functional silicone emulsion comprises amino siloxane microemulsion.

4. The composition of claim 1, wherein the protectant is present in an amount of about 0.01% to about 1% by weight of the composition.

5. The composition of claim 1, wherein the preservative is present in an amount of about 0.01% to about 0.5% by weight of the composition.

6. The composition of claim 1, wherein the preservative comprises benzisothiazolinone.

7. The composition of claim 1, further comprising water.

8. The composition of claim 7, wherein the water is present in an amount of about 65% to about 95% by weight of the composition.

9. The composition of claim 1, further comprising a propellant.

10. The composition of claim 9, wherein the propellant is present in an amount of about 0.5% to about 15% by weight of the composition.

11. The composition of claim 9, wherein the propellant comprises a blend of isobutane and propane.

12. The composition of claim 1, the composition consisting essentially of:
   a cationic amino functional silicone emulsion in an amount of about 0.1% to about 15% by weight of the composition;
   a protectant, wherein the protectant is a hindered amine light stabilizer (HALS);
   a preservative; and
   water;
   and optionally a propellant.

13. The composition of claim 1, the composition consisting of:
   a cationic amino-functional silicone emulsion in an amount of about 0.1% to about 15% by weight of the composition;
   a protectant, wherein the protectant is a hindered amine light stabilizer (HALS);
   a preservative; and
   water;
   and optionally a propellant.

14. A method of treating a leather surface, the method comprising:
- applying a composition to the leather surface, wherein the composition comprises:
  - a cationic amino functional silicone emulsion;
  - a protectant, wherein the protectant is a hindered amine light stabilizer (HALS); and a preservative;
  - and optionally a propellant;
- and optionally wiping off the composition from the leather surface.

15. The method of claim 14, wherein the cationic amino functional silicone emulsion comprises an aminoalkyl-functional organopolysiloxane fluid and water.

16. The method of claim 14, wherein the cationic amino functional silicone emulsion is present in an amount of about 0.1% to about 15% by weight of the composition.

17. The method of claim 14, wherein the composition further comprises water.

18. The method of claim 14, wherein the leather surface is a colored leather surface, an uncolored leather surface, a textured leather surface, an automotive leather surface, a non-automotive leather surface, or combinations thereof.

19. The method of claim 14, wherein the composition is a fluid, and the fluid is applied by means of an aerosol, a trigger sprayer, a sponge, a microfiber cloth, or combinations thereof.

\* \* \* \* \*